United States Patent
Shiratani et al.

(10) Patent No.: US 6,729,128 B2
(45) Date of Patent: May 4, 2004

(54) EMISSION CONTROL APPARATUS AND EMISSION CONTROL METHOD

(75) Inventors: Kazuhiko Shiratani, Susono (JP); Naohisa Oyama, Okazaki (JP); Yoshitada Kodama, Gamagouri (JP)

(73) Assignees: Toyota Jidosha Kabushiki Kaisha, Toyota (JP); Nippon Soken, Incorporated, Nishio (JP)

( * ) Notice: Subject to any disclaimer, the term of this patent is extended or adjusted under 35 U.S.C. 154(b) by 0 days.

(21) Appl. No.: 10/171,650

(22) Filed: Jun. 17, 2002

(65) Prior Publication Data

US 2002/0194844 A1 Dec. 26, 2002

(30) Foreign Application Priority Data

Jun. 26, 2001 (JP) ........................................ 2001-192331

(51) Int. Cl.⁷ ................................................ F01N 3/00
(52) U.S. Cl. ............................ 60/297; 60/275; 60/280; 60/295; 60/311
(58) Field of Search .......................... 60/274, 280, 286, 60/287, 291, 295, 275, 297, 303, 300, 311

(56) References Cited

U.S. PATENT DOCUMENTS

| | | | |
|---|---|---|---|
| 4,380,149 A | | 4/1983 | Ludecke |
| 4,709,547 A | | 12/1987 | Pischinger et al. |
| 4,934,142 A | * | 6/1990 | Hayashi et al. ................ 60/297 |
| 5,121,601 A | * | 6/1992 | Kammel ........................ 60/275 |
| 5,319,930 A | | 6/1994 | Shinzawa et al. |
| 5,457,945 A | * | 10/1995 | Adiletta ........................ 55/301 |
| 5,620,490 A | * | 4/1997 | Kawamura ................. 55/282.3 |
| 5,651,250 A | * | 7/1997 | Kawamura .................... 60/303 |
| 5,820,833 A | * | 10/1998 | Kawamura .................. 422/174 |
| 5,851,249 A | | 12/1998 | Henda et al. |
| 5,908,480 A | | 6/1999 | Ban et al. |
| 5,930,995 A | | 8/1999 | Watanabe et al. |
| 5,941,066 A | | 8/1999 | Araki et al. |

FOREIGN PATENT DOCUMENTS

| | | |
|---|---|---|
| DE | 37 11 101 A1 | 10/1987 |
| DE | 199 45 372 A1 | 3/2001 |
| EP | 0 823 545 A1 | 2/1998 |
| FR | 2 786 529 | 6/2000 |
| JP | 59077025 | 5/1984 |
| JP | U 5-69311 | 9/1993 |
| JP | B2 7-106290 | 11/1995 |
| JP | A 2000-80912 | 3/2000 |

\* cited by examiner

*Primary Examiner*—Binh Tran
(74) *Attorney, Agent, or Firm*—Oliff & Berridge, PLC

(57) ABSTRACT

Carbon-containing suspended particulates in exhaust gas from an internal combustion engine are collected by a heat-resistant filter, and are burned on the filter. It is determined whether there is a need to increase the temperature of the heat-resistant filter. If it is necessary to increase the filter temperature, the dynamic pressure on the filter is increased. The conceivable cases where a filter temperature increase is needed includes a case where the exhaust gas temperature is low, a case where the filter is clogged to some extent, etc. If the dynamic pressure on the heat-resistant filter is increased, the filter temperature rises. Therefore, particulates can be effectively removed from exhaust gas while the clogging of the heat-resistant filter is avoided.

6 Claims, 19 Drawing Sheets

EMISSION CONTROL APPARATUS AND EMISSION CONTROL METHOD

INCORPORATION BY REFERENCE

The disclosure of Japanese Patent Application No. 2001-192331 filed on Jun. 26, 2001 including the specification, drawings and abstract is incorporated herein by reference in its entirety.

BACKGROUND OF THE INVENTION

1. Field of the Invention

The invention relates to a technology for reducing or eliminating suspended particulates in exhaust gas produced from an internal combustion engine.

2. Description of the Related Art

The exhaust gas from internal combustion engines and, particularly, diesel engines, contains suspended particulates, such as black smoke (soot) and the like. It is strongly demanded that the total amount of carbon-containing suspended particulates emitted into the atmosphere be reduced in order to prevent further air pollution. A like demand exists regarding generally termed direct injection type gasoline engines in which gasoline is injected directly into a combustion chamber, because carbon-containing suspended particulates may be discharged together with exhaust gas depending on the engine operation conditions.

One proposed technology for reducing the carbon-containing suspended particulates emitted from an internal combustion engine and, particularly, a diesel engine, is a technology that removes suspended particulates from exhaust gas by using a heat-resistant filter loaded with an oxidation catalyst (Japanese Examined Patent Application Publication No. 7-106290). In this technology, suspended particulates in exhaust gas are collected by the filter, and the collected particulates are burned in exhaust gas at relatively low temperature (typically, 350° C. to 400° C.) due to the effect of the oxidation catalyst. Thus, by collecting and burning carbon-containing particulates in exhaust gas, the amount of suspended particulates released into the atmosphere can be considerably reduced.

However, in some cases, the temperature of exhaust gas becomes lower than the temperature (350° C. to 400° C.) that allows combustion of collected carbon-containing particulates. Therefore, during use of a filter, particulates deposit on the filter, thus giving rise to the problem of filter clogging. Specifically, under a condition that the exhaust gas temperature is lower than the temperature that allows combustion of collected carbon-containing particulates, suspended particulates in exhaust gas deposit on the filter. If the exhaust gas temperature sufficiently rises, combustion of carbon-containing particulates is resumed. However, some particulates on the filter may remain unburned if a great amount of particulates has deposited, and therefore needs a long time for complete combustion thereof. Furthermore, it is known that the carbon-containing particulates deposited on the filter gradually become less apt to burn. As incombustible particulates cover the oxidation catalyst, it becomes difficult to burn carbon-containing particulates on the filter. As the collected particulates cannot be appropriately processed, the filter becomes clogged in some cases.

SUMMARY OF THE INVENTION

It is an object of the invention to provide a technology capable of effectively reducing carbon-containing particulates suspended in exhaust gas without allowing a filter to be clogged.

A first aspect of the invention is an emission control apparatus for reducing carbon-containing particulates contained in an exhaust gas from an internal combustion engine. The emission control apparatus includes a heat-resistant filter provided in a passage of the exhaust gas for collecting the carbon-containing particulates and controlling the exhaust gas through combustion of the particulates collected, a temperature increase need determining device that determines whether to increase a temperature of the heat-resistant filter, and a dynamic pressure increasing device that increases a dynamic pressure of the exhaust gas on the heat-resistant filter if it is determined that the temperature of the heat-resistant filter is to be increased.

The emission control method of the invention corresponding to the above-described emission control apparatus is an emission control method for reducing carbon-containing particulates contained in an exhaust gas from an internal combustion engine. The method includes the steps of: collecting and burning the carbon-containing particulates by using a heat-resistant filter provided in a passage of the exhaust gas; determining whether to increase a temperature of the heat-resistant filter; and increasing a dynamic pressure on the exhaust gas on the heat-resistant filter if it is determined that the temperature of the heat-resistant filter is to be increased.

The invention has been accomplished based on consideration of a phenomenon found by the inventors in which the temperature of a heat-resistant filter provided in an exhaust passage rises if the dynamic pressure of exhaust gas discharged from an internal combustion engine acts on the heat-resistant filter. As a preparation for description of the operation and advantages of the invention, this newly found phenomenon will be briefly described.

FIGS. 19A and 19B are diagrams conceptually illustrating the phenomenon in which the dynamic pressure of exhaust gas acting on the heat-resistant filter increases the filter temperature. FIG. 19A conceptually illustrates a laboratory device in which a heat-resistant filter E is disposed in an exhaust pipe of an internal combustion engine A (representatively, a diesel engine). The internal combustion engine A draws in air from an intake pipe B, and burns fuel within a combustion chamber C, and discharges exhaust gas via an exhaust pipe D. Carbon-containing suspended particulates contained in exhaust gas, such as sooth and the like, are collected by the heat-resistant filter E provided in the exhaust pipe D. The temperature Tg of exhaust gas flowing into the heat-resistant filter E, and the temperature Tf of the heat-resistant filter can be measured.

Using the foregoing device, the temperature Tg of exhaust gas flowing into the heat-resistant filter and the filter temperature Tf were measured while the operation condition of the internal combustion engine A was changed. The filter temperature Tf was found to always exhibit a higher value than the inlet exhaust gas temperature Tg. Therefore, the inlet exhaust gas temperature Tg and the amount of increase of the filter temperature Tf from the inlet exhaust gas temperature Tg (dT=Tf−Tg) were determined while the exhaust gas temperature was changed with other factors, such as the amount of flow of exhaust gas and the like, being kept fixed as much as possible. Results are indicated in FIG. 19B.

As indicated in FIG. 19B, the amount of increase dT of the filter temperature exhibits a tendency of substantially linearly increasing with increases in the inlet exhaust gas temperature Tg. Therefore, it is assumed that the phenomenon in which the filter temperature Tf becomes higher than the inlet exhaust gas temperature Tg is based on a mechanism described below.

That is, the heat-resistant filter E has a gas flow resistance. Therefore, when exhaust gas passes through the heat-resistant filter E at great flow speed, exhaust gas is impeded by the heat-resistant filter E, so that a portion of the speed of exhaust gas is converted into pressure. This pressure increase is expressed as dP. According to teaching in thermodynamics, three variables of pressure P, temperature T and specific volume v satisfy the following relationship:

$$P \cdot v = R \cdot T \qquad (1)$$

where R is a gas constant. Therefore, if the pressure P increases by dP due to impediment of flow of exhaust gas by the heat-resistant filter E, the exhaust gas temperature also increases by dT so as to satisfy equation (1). That is, the phenomenon in which the filter temperature Tf is always higher than the inlet exhaust gas temperature Tg is considered to be based on the following mechanism. That is, exhaust gas is compressed in the heat-resistant filter due to the dynamic pressure, so that the gas temperature correspondingly rises and the exhaust gas with the increased temperature warms the filter. Therefore, the inlet exhaust gas temperature Tg is always higher than the inlet exhaust gas temperature Tg.

In order to verify the validity of the mechanism, the following analysis was conducted based on measurement results as indicated in FIG. 19B. From the equation (1), an exhaust gas pressure Pg at an inlet of the heat-resistant filter E and the inlet exhaust gas temperature Tg satisfy the following equation:

$$Pg \cdot v = R \cdot Tg \qquad (2)$$

If the pressure and the temperature increase by dP and dT due to impediment of flow of exhaust gas by the heat-resistant filter E, the following equation holds based on the equation (1).

$$(Pg+dP) \cdot v = R \cdot (Tg+dT) \qquad (3)$$

By combining the equations (2) and (3), the following equation is obtained.

$$dT = (Tg \cdot dP)/Pg \qquad (4)$$

According to the equation (4), the temperature increase dT should be proportional to the temperature of exhaust gas flowing into the filter (inlet exhaust gas temperature Tg), which agrees with the measurement results indicated in FIG. 19B. That is, the measurement results in FIG. 19B support the validity of the speculated mechanism described above. The phenomenon in which the filter temperature Tf is always higher than the inlet exhaust gas temperature Tg measured at the inlet of the heat-resistant filter is considered to be based on a temperature increase of exhaust gas caused by compression of the exhaust gas that occurs when exhaust gas from the internal combustion engine passes through the heat-resistant filter.

As is apparent from the equation (4), the temperature increase dT increases with increases in the exhaust gas temperature Tg. If the flow speed of exhaust gas flowing into the heat-resistant filter increases, the pressure increase dP corresponding increases, and therefore, the temperature increase dT of the filter also increases. In general, the temperature of exhaust gas from an internal combustion engine decreases as exhaust gas flows through the exhaust pipe. As for the flow speed, when discharged from the internal combustion engine, exhaust gas instantaneously jets out, and forms a pulse-like flow with a great flow speed. However, as the exhaust gas passes through the exhaust pipe, the pulse-like flows average out, and the flow speed decreases. Therefore, if the location of the heat-resistant filter is closer to the internal combustion engine (for example, the heat-resistant filter is disposed in the exhaust port), the temperature and the flow speed of exhaust gas become greater, so that the filter temperature increase dT increases. Hence, the position of the heat-resistant filter closer to the engine is considered preferable.

The present invention has been accomplished based on the above-described newly found phenomenon and the considerations regarding the phenomenon. In the invention, carbon-containing suspended particulates in exhaust gas are collected by a heat-resistant filter. It is determined whether to increase the temperature of the heat-resistant filter. If it is determined that the filter temperature is to be increased, the dynamic pressure on the heat-resistant filter is increased. If the dynamic pressure is thus increased, the temperature increase of the heat-resistant filter caused by the dynamic pressure increases, so that the filter temperature can be increased.

In the above-described emission control apparatus, a temperature of the exhaust gas may be detected, and the temperature increase need determining device may determine whether there is a need to increase the temperature of the heat-resistant filter based on the detected temperature of the exhaust gas. If the exhaust gas temperature is measured at an upstream side or a downstream side of the heat-resistant filter, it becomes possible to appropriately determine whether there is a need to increase the filter temperature based on the temperature of the filter estimated from the measured exhaust gas temperature. Therefore, this construction is also preferable.

In the emission control apparatus, an inflow temperature of the exhaust gas flowing into the heat-resistant filter may be detected, and the temperature increase need determining device may determine that it is necessary to increase the temperature of the heat-resistant filter, if the inflow temperature detected is lower than a predetermined temperature. If the temperature of exhaust gas flowing into the heat-resistant filter is low, the filter temperature is correspondingly low. Therefore, if the aforementioned determination is made based on the inflow temperature of exhaust gas, it becomes possible to appropriately determine whether there is a need to increase the filter temperature. Thus, this construction is preferable.

Alternatively, an outflow temperature of the exhaust gas flowing out of the heat-resistant filter may be detected, and the temperature increase need determining device may determine that it is necessary to increase the temperature of the heat-resistant filter, if the outflow temperature detected is lower than a predetermined temperature. If the temperature of the heat-resistant filter decreases, the temperature of exhaust gas flowing out of the filter correspondingly decreases. Therefore, if the determination is made based on the outflow temperature of exhaust gas, it becomes possible to appropriately determine whether there is a need to increase the temperature of the heat-resistant filter.

Furthermore, in the emission control apparatus in accordance with the first aspect of the invention, an operation condition of the internal combustion engine may be detected, and the temperature increase need determining device may determine whether there is a need to increase the temperature of the heat-resistant filter based on the detected operation condition. If the operation condition of the internal combustion engine is determined, the exhaust gas temperature is substantially determined, so that the temperature of the heat-resistant filter can be estimated. Therefore, if the determination is made based on the operation condition of the internal combustion engine, it becomes possible to appropriately determine whether there is a need to increase the temperature of the heat-resistant filter. Thus, this construction is preferable.

In the emission control apparatus in which it is determined whether there is a need to increase the temperature of the heat-resistant filter based on the operation condition of the internal combustion engine, the temperature increase need determining device may determine that it is necessary to increase the temperature of the heat-resistant filter, if the internal combustion engine is continuously operated for at least a predetermined time in a predetermined operation region where the temperature of the exhaust gas is lower than or equal to a predetermined temperature. Even if the exhaust gas temperature decreases, the temperature of the heat-resistant filter does not immediately decrease, but starts decreasing after some time in many cases. Therefore, if it is determined that it is necessary to increase the temperature of the heat-resistant filter in the case where the internal combustion engine is continuously operated in the predetermined operation region for at least the predetermined time, it becomes possible to appropriately make the determination. Thus, this construction is preferable.

In the emission control apparatus of the first aspect of the invention, a gas flow resistance of the heat-resistant filter may be detected, and the temperature increase need determining device may determine that it is necessary to increase the temperature of the heat-resistant, if the gas flow resistance detected is greater than a predetermined value. If the rate of removing the carbon-containing particulates collected by the heat-resistant filter is lower than the rate of collecting carbon-containing particulates from exhaust gas, the gas flow resistance of the heat-resistant filter gradually increases due to deposit of particulates. Therefore, if the temperature of the heat-resistant filter is raised by increasing the dynamic pressure on the filter when the gas flow resistance exceeds a predetermined value, the rate of removing the carbon-containing particulates improves, so that the carbon-containing particulates deposited on the filter can be removed. Hence, the gas flow resistance of the filter can be brought back to an appropriate value. Thus, this construction is preferable.

In the emission control apparatus in which the gas flow resistance is detected, the gas flow resistance may be detected by detecting a pressure difference between a pressure in the passage upstream of the heat-resistant filter and a pressure in the passage downstream of the heat-resistant filter. If the gas flow resistance is detected based on the differential pressure across the filter, an accurate gas flow resistance can be detected. Hence, it becomes possible to appropriately determine whether there is a need to increase the temperature of the heat-resistant. Thus, this construction is preferable.

Alternatively, in the emission control apparatus, an operation condition of the internal combustion engine may be detected, and the gas flow resistance may be detected by detecting the pressure in the passage upstream of the heat-resistant filter when the engine is operated under a predetermined operation condition. If the gas flow resistance of the heat-resistant filter is within an appropriate range, the in-passage pressure upstream of the heat-resistant filter automatically becomes a pressure within a predetermined range in accordance with the operation condition of the internal combustion engine. Therefore, if the in-passage pressure is detected upstream of the heat-resistant filter when the internal combustion engine is operated under the predetermined operation condition, it becomes possible to appropriately determine whether there is a need to increase the temperature of the heat-resistant filter, by employing a simple and convenient method. Thus, this construction is preferable.

In the emission control apparatus of the first aspect of the invention, the dynamic pressure on the heat-resistant filter may be increased by advancing a valve opening timing of an exhaust valve provided in a combustion chamber of the internal combustion engine, if it is determined that there is a need to increase the temperature of the heat-resistant filter. If the exhaust valve-opening timing is advanced, exhaust gas with an increased pressure jets out from the combustion chamber via the exhaust valve. Therefore, the flow speed of exhaust gas correspondingly increases. If the flow speed of exhaust gas is increased in this manner, the dynamic pressure on the heat-resistant filter correspondingly increases, so that the temperature of the heat-resistant filter can be increased. Thus, this construction is preferable.

Alternatively, in the emission control apparatus, it is also possible to retard a valve opening timing of an exhaust valve provided in a combustion chamber of the internal combustion engine by at least a predetermined value, instead of advancing the exhaust valve-opening timing, if it is determined that there is a need to increase the temperature of the heat-resistant filter. If the exhaust valve-opening timing is retarded by at least the predetermined value, the exhaust gas in the combustion chamber instantaneously jets out due to the delay in the opening of the exhaust valve, so that the flow speed of exhaust gas increases. As the flow speed of exhaust gas is increased in this manner, the dynamic pressure on the heat-resistant filter correspondingly increases, so that the filter temperature will increase. Thus, this construction is preferable.

In the emission control apparatus of the first aspect of the invention, if the internal combustion engine is operated by injecting a fuel into a combustion chamber of the internal combustion engine and burning the fuel, it is possible to inject an additional fuel during an expansion stroke of the internal combustion engine if it is determined that there is a need to increase the temperature of the heat-resistant filter. If an addition amount of fuel is injected into the combustion chamber during the expansion stroke of the internal combustion engine, the in-combustion chamber pressure at the exhaust valve-opening timing increases due to the combustion of the additionally injected fuel. As a result, the flow speed of exhaust gas increases, so that it becomes possible to increase the dynamic pressure on the heat-resistant filter. Thus, this construction is preferable. Furthermore, the additional fuel injection during the expansion stroke of the engine accomplishes supply of fuel without a considerable effect on the engine output. Therefore, by injecting a slightly increased amount of fuel, the in-combustion chamber pressure occurring at the exhaust valve-opening timing can be effectively increased. Thus, this construction is preferable.

If the emission control apparatus is applied to an internal combustion engine in which fuel is injected into the combustion chamber, a timing of injecting the fuel may be retarded if it is determined that there is a need to increase the temperature of the heat-resistant filter. If the fuel injection timing is retarded, the pressure in the combustion chamber cannot be efficiently converted into output of the internal combustion engine. This means that thermal energy generated by combustion of fuel remains within the combustion chamber without being converted into output of the engine. Therefore, retardation of the fuel injection timing increases the in-combustion chamber pressure occurring at the exhaust valve-opening timing. If the combustion pressure at the exhaust valve-opening timing increases, exhaust gas jets out via the exhaust valve with a correspondingly increased momentum, so that it becomes possible to increase the dynamic pressure on the heat-resistant filter.

Alternatively, if the emission control apparatus of the first aspect of the invention is applied to an internal combustion engine equipped with a turbocharger for compressing air and supplying compressed air into a combustion chamber of the internal combustion engine, a boost pressure of the turbocharger may be increased if it is determined that there is a need to increase the temperature of the heat-resistant filter. If the boost pressure of the turbocharger is increased, the amount of air introduced into the combustion chamber increases, and the amount of exhaust gas correspondingly increases. As a result, the dynamic pressure on the heat-resistant filter can be increased. Thus, this construction is preferable.

Alternatively, if the internal combustion engine has a plurality of combustion chambers, exhaust passages provided separately for the combustion chambers for discharging the exhaust gas from the combustion chambers, and communication passages for interconnecting the exhaust passages in communication, open-close valves may be provided separately for the communication passages, and the open-close valves may be closed if it is determined that there is a need to increase the temperature of the heat-resistant filter. If the open-close valves provided in the communication passages are closed, the entire amount of exhaust gas from a combustion chamber flows only through the exhaust passage of the combustion chamber without any portion of the exhaust gas escaping into another exhaust passage via a communication passage. Therefore, the amount of flow of exhaust gas that passes through the heat-resistant filter increases, so that the dynamic pressure on the heat-resistant filter can be correspondingly increased.

In the foregoing emission control apparatus of the first aspect of the invention, the heat-resistant filter may be a filter as described below. That is, the heat-resistant filter may be a filter which collects the carbon-containing particulates and hydrocarbon compounds contained in the exhaust gas in a dispersed fashion that allows the carbon-containing particulates and the hydrocarbon compounds collected by the filter to contact oxygen present in the exhaust gas, and which allows the carbon-containing particulates and the hydrocarbon compounds collected to burn by using an exhaust gas whose inflow temperature is lower than a combustible temperature of the carbon-containing particulates.

If carbon-containing particulates in exhaust gas are collected in a dispersed fashion by using the above-described filter, the collected particulates can easily be burned. Since this filter makes it possible to easily burn particulates, the combustion of collected carbon-containing particulates can be more effectively accelerated by increasing the dynamic pressure on the filter and thereby raising the filter temperature. Thus, this construction is preferable.

Alternatively, in the emission control apparatus of the first aspect of the invention, the heat-resistant filter may be a heat-resistant filter loaded with an oxidation catalyst. Preferable oxidation catalysts supported on the heat-resistant filter includes precious metal catalysts that exhibit good oxidizing activity and good durability, such as platinum, palladium, rhodium, etc. In the case where the oxidation catalyst-loaded heat-resistant filter is employed, too, an increase in the filter temperature caused by increasing the dynamic pressure on the filter will accelerate the combustion of carbon-containing particulates collected by the filter. Thus, this construction is preferable.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF PREFERRED EMBODIMENTS

In order to further clearly describe the operation and advantages of the invention, embodiments of the invention will be described in the following sequence.

Figure 1:
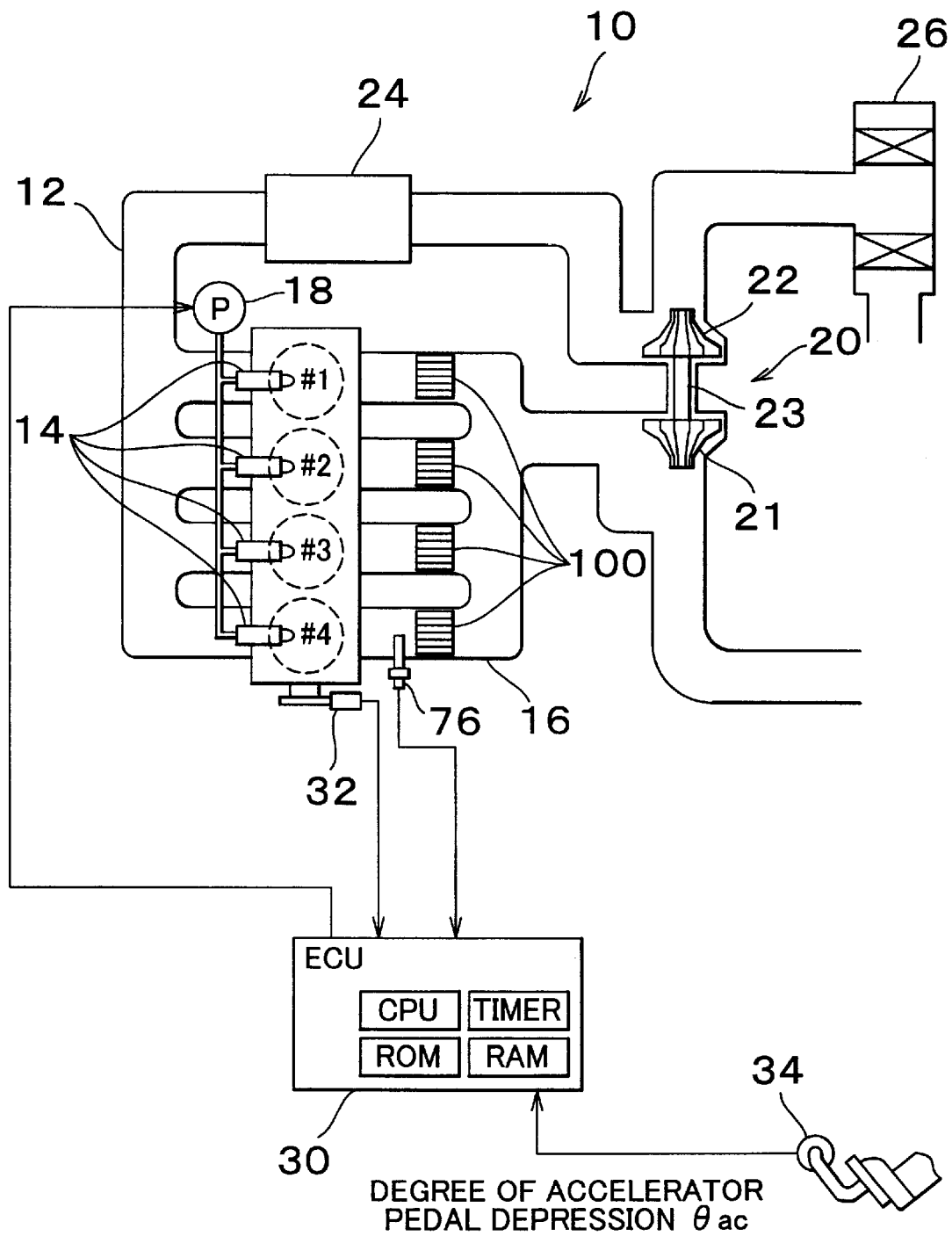
FIG. 1 is a diagram illustrating a construction of a diesel engine to which an emission control apparatus of a first embodiment is applied.

A. Overview of Embodiments
B. First Embodiment
B-1. Apparatus Construction
B-1-1. Construction of Engine
B-1-2. Construction of Emission Control Filter
B-1-3. Mechanism of Removing Carbon-Containing Suspended Particulate
B-2. Overview of Engine Control
B-3. Dynamic Pressure Increasing Control of First Embodiment
B-4. Modifications
B-4-1. First Modification
B-4-2. Second Modification
C. Second Embodiment
C-1. Apparatus Construction
C-2. Overview of Engine Control
C-3. Dynamic Pressure Increasing Control of Second Embodiment
C-4. Modifications A. Overview of Embodiments FIG. 1 is a diagram illustrating a construction of a diesel engine to which an emission control apparatus of a first embodiment is applied. To facilitate the understanding of the invention, an overview of embodiments of the invention will be described with reference to FIG. 1 prior to detailed description of the embodiments.

As indicated in FIG. 1, an internal combustion engine, such as a diesel engine, a gasoline engine or the like, emits exhaust gas produced by operation of the engine into the atmosphere via an exhaust pipe 16. The exhaust gas contains carbon-containing suspended particulates such as generally termed soot and the like. In order to prevent release of such carbon-containing suspended particulates into the atmosphere, particulates are collected by heat-resistant filters 100 provided in exhaust passages. If the exhaust gas temperature is sufficiently high, the collected carbon-containing particulates can be burned on the heat-resistant filters. If the exhaust gas temperature is relatively low, it becomes difficult in some cases to burn the collected particulates due to a reduced filter temperature.

Therefore, the emission control apparatus of the invention determines whether there is a need to raise the filter temperature. If it is necessary to raise the filter temperature, the emission control apparatus performs a control such that the dynamic pressure on the filters will rise. As for the method for determining whether a filter temperature increase is needed, it is possible to adopt various methods as described below. If the dynamic pressure on the filters is increased, the filter temperature can be raised due to the above-described mechanism, so that combustion of the collected carbon-containing particulates will be accelerated and the clogging of the filters can be avoided. This technique can be effectively applied to not only the case where the exhaust gas temperature is low, but also a case where filter clogging is about to occur due to, for example, a great amount of carbon-containing suspended particulates discharged from the engine. That is, if the filter temperature is raised by increasing the dynamic pressure on the filters, the combustion of collected particulates is accelerated, so that filter clogging can be resolved. The emission control apparatus of the invention described above can be understood in various embodiments. Various embodiments of the invention will be described in detail below.

B. First Embodiment
B-1. Apparatus Construction
B-1-1. Construction of Engine

With reference to FIG. 1, a construction of a diesel engine 10 equipped with an emission control apparatus of the first embodiment will be described. Although FIG. 1 shows an embodiment in which the emission control apparatus is applied to a diesel engine, the emission control apparatus is applicable to not only a diesel engine, but also other internal combustion engines such as a type of gasoline engine in which fuel is directly injected into a cylinder, and the like. Furthermore, the emission control apparatus is applicable to internal combustion engines for any kind of use, for example, motor vehicle-installed engines, marine craft-installed engines, stationary engines, etc.

The diesel engine 10 is a four-cylinder engine having four combustion chambers #1 to #4. Air is supplied to the combustion chambers via an intake pipe 12, and fuel is injected from a fuel injection valve 14 provided for each combustion chamber. Thus, air and fuel burn within the combustion chambers. Exhaust gas produced by the combustion is emitted into the atmosphere via the exhaust pipe 16. Exhaust gas from the diesel engine 10 contains carbon-containing suspended particulates such as soot and the like. The particulates are mostly collected by the heat-resistant filters 100 provided in the exhaust pipe 16, so that substantially no carbon-containing suspended particulates are released into the atmosphere. The carbon-containing particulates collected by the filters 100 can be burned on the filters by a mechanism described below. A temperature sensor 76 is disposed at an upstream side of the filters 100, so that the temperature of exhaust gas flowing into the filters 100 can be detected.

A turbocharger 20 is provided in an intermediate portion of the exhaust pipe 16. The turbocharger 20 is made up of a turbine 21 provided in the exhaust pipe 16, a compressor 22 provided in the intake pipe 12, and a shaft 23 that connects the turbine 21 and the compressor 22. As exhaust gas from the combustion chambers rotates the turbine 21 of the turbocharger 20, the compressor 22 rotates via the shaft 23, thereby compressing air and feeding compressed air into each combustion chamber. An air cleaner 26 is provided upstream of the compressor 22. The compressor 22 takes up air from the air cleaner 26, and compresses the air and feeds it into each combustion chamber. The temperature of air rises as air is compressed by the compressor 22. Therefore, an intercooler 24 for cooling air is provided downstream of the compressor 22. Therefore, it is possible to cool compressed air by the intercooler 24 before supplying the air into the combustion chambers.

An engine-controlling ECU 30 is a well-known microcomputer in which a CPU, a RAM, a ROM, a timer, various input/output ports, etc. are interconnected by a bus for data exchange. The engine-controlling ECU 30 detects various operation conditions of the engine, such as the engine rotation speed Ne, the degree of accelerator pedal depression θac, etc., and calculates the amount of fuel injected, the injection timing, etc., in accordance with the engine operation conditions. The engine rotation speed Ne can be detected based on output from a crank angle sensor 32. The degree of accelerator pedal depression θac is detected by an accelerator depression sensor 34 mounted on an accelerator pedal. On the basis of the engine rotation speed Ne and the degree of accelerator pedal depression θac detected as described above, the engine-controlling ECU 30 controls a fuel supply pump 18, the fuel injection valves 14, etc., so as to inject an appropriate amount fuel into each combustion chamber at an appropriate timing. As a result, the fuel injected into the combustion chambers burns, and pressure rises therein. In this manner, torque is output from the diesel engine 10. As described below, the diesel engine 10 of this embodiment has, at an exhaust valve side, a generally termed variable valve timing mechanism capable of controlling the valve opening timing. The opening timing of the exhaust valves is determined by the engine-controlling ECU 30 in accordance with the engine operation conditions. The variable valve timing mechanism will be detailed later.

B-1-2. Construction of Emission Control Filter

Figure 2:
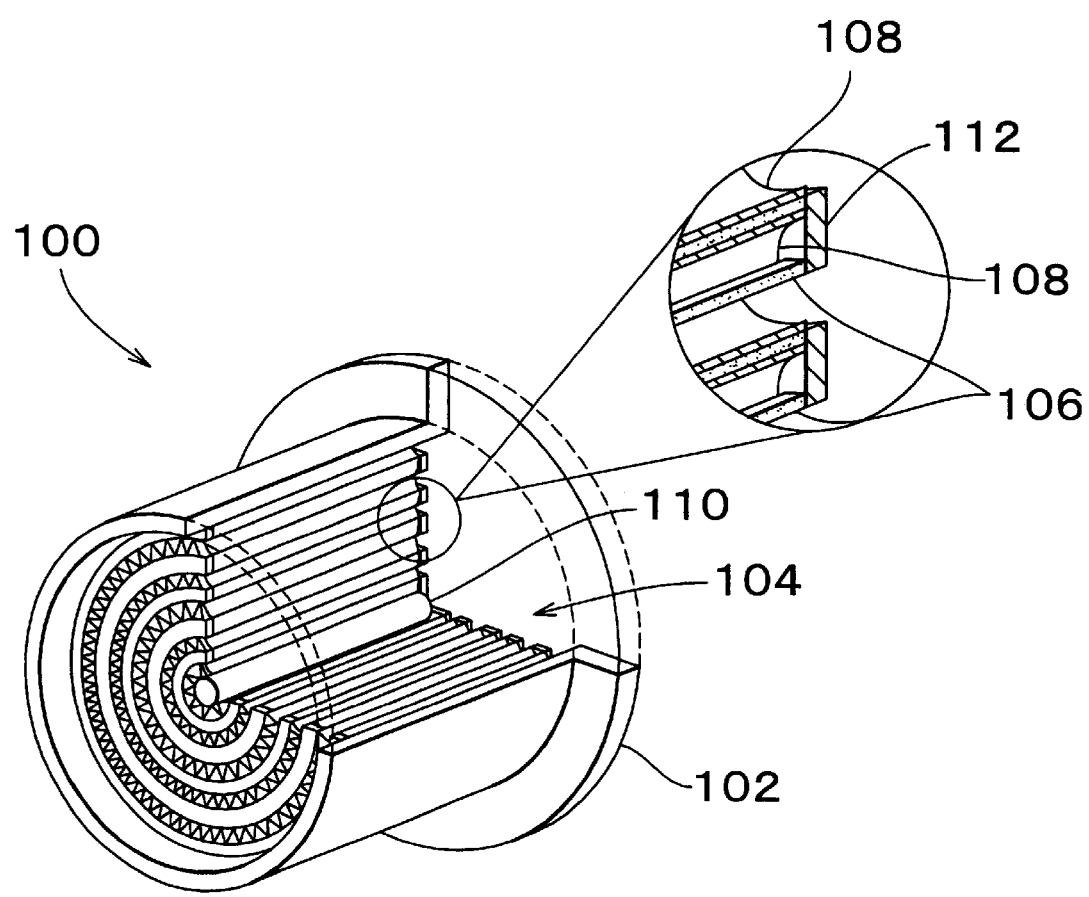
FIG. 2 is a diagram illustrating an external configuration and a structure of a particulate filter in accordance with the embodiment.

FIG. 2 is a perspective view of an emission control filter 100 disposed in the exhaust pipe 16, illustrating an external configuration thereof. For better understanding, a partially sectional view of an internal construction is provided, with an enlarged view of a portion of the internal construction. The emission control filter 100 is substantially made up of a cylindrical case 102, and a filter element 104 that is disposed within the case 102 and is welded at an outer periphery thereof to the case. The filter element 104 has a roll structure in which a heat-resistant metallic non-woven fabric 106 and a heat-resistant metallic corrugated plate 108 are layered on each other, and are wound around a central rod 110 into a cylindrical shape. The filter element 104 employed by the emission control filter 100 of this embodiment has an outside diameter of about 5 mm, and a length of about 40 mm. These dimensions of the filter element 104 may be changed in accordance with the displacement of the diesel engine, the inside diameter of the exhaust pipe 16, etc.

Since the non-woven fabric 106 and the corrugated plate 108 are wound together, a predetermined interval is maintained between adjacent layers of the non-woven fabric 106 by the corrugated plate 108. Many channels extending in the direction of an axis of the central rod 110 are formed between the non-woven fabric 106 and the corrugated plate 108. Seal plates 112 are welded to two opposite ends of the filter element 104. The seal plates 112 close the channels between the non-woven fabric 106 and the corrugated plate 108 in such a stagger fashion as to form a structure in which exhaust gas will pass through the non-woven fabric 106. Described below with reference to FIG. 3 will be how a structure in which exhaust gas passes through the non-woven fabric 106 is formed by the seal plates 112.

Figure 3:
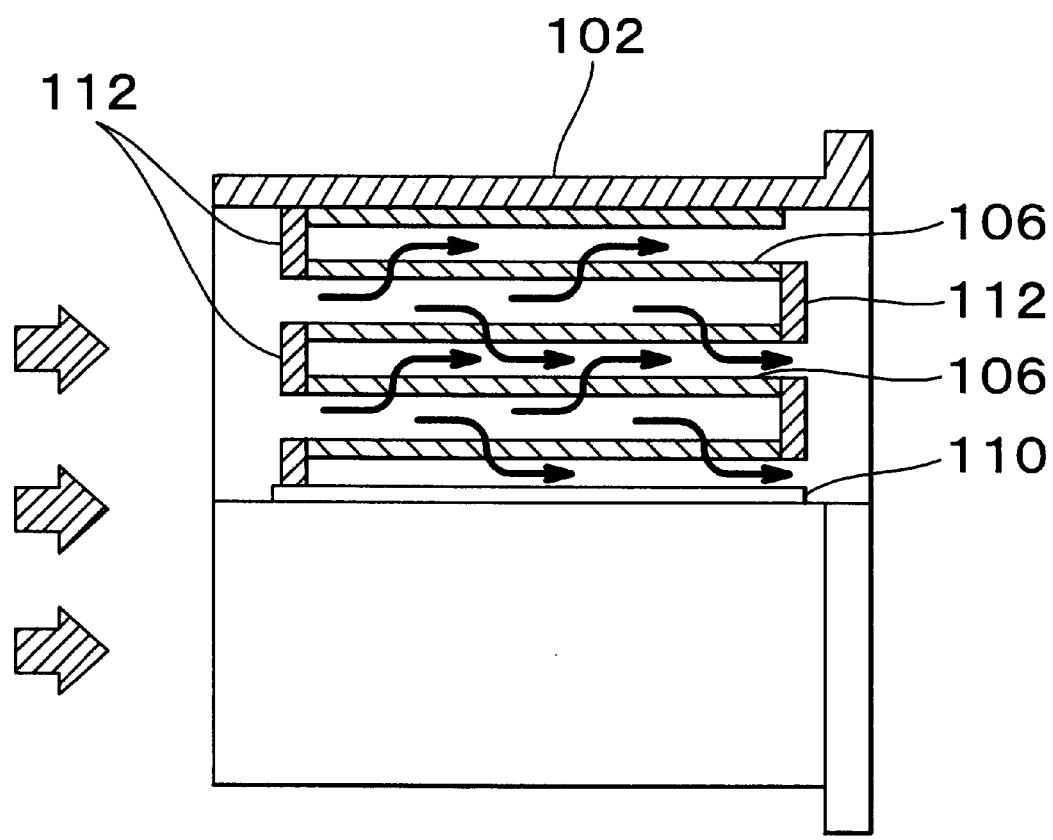
FIG. 3 is a diagram conceptually illustrating how particulates in exhaust gas are collected by the particulate filter in the embodiment.

FIG. 3 is a diagram conceptually illustrating a sectional structure of the emission control filter 100. In order to avoid complicated illustration, the corrugated plate 108 is omitted from FIG. 3. As shown in FIG. 3, the seal plates 112 close the channels formed between adjacent non-woven fabric sheets 106 with a predetermined interval maintained therebetween, in such a fashion as to form a stagger configuration. Therefore, if exhaust gas approaches the emission control filter 100 from the left side as indicated by arrows in FIG. 3, exhaust gas enters the channels that are not closed by seal plates 112. However, those channels are closed by the outlet-side seal plate 112. Therefore, as indicated by thick-line arrows in FIG. 3, exhaust gas passes through the non-woven fabric sheets 106, and flows through the channels that are open at the outlet side. As exhaust gas flows through the non-woven fabric 106 in this manner, carbon-containing suspended particulates contained in exhaust gas, such as sooth or the like, can be trapped by the non-woven fabric 106.

The non-woven fabric 106 is an iron-based heat-resistant metallic non-woven fabric. The filament diameter of the non-woven fabric and the size of pores formed within the non-woven fabric are pre-set at appropriate values. Therefore, the emission control filter 100 is able to collect carbon-containing suspended particulates and hydrocarbon compounds in a dispersed state such that the collected particulates and compounds can contact oxygen. If suspended particulates are collected in a three-dimensionally dispersed state, the collected particulates spontaneously ignite when the amount of particulates collected reaches a predetermined amount. A mechanism of collection of carbon-containing suspended particulates and hydrocarbon compounds in a dispersed state and a mechanism of spontaneous ignition of carbon-containing particulates collected in a dispersed fashion will be described later.

The "filament diameter" herein refers to a mean diameter of metal filaments of the non-woven fabric. In the metallic non-woven fabric, a great number of metal filaments are entangled with one another in a complicated manner, and three-dimensional passages that branch in a complicated manner extend between the metal filaments. The "pore size" is an index indicating the size of section of a passage formed between metal filaments, and represents an inside diameter of circular passages having a sectional area that is equivalent to the aforementioned size of passage section. In a simple and convenient embodiment, the value of "pore size" may be measured by visual observation based on a photograph of a section or a surface of the metal non-woven fabric photographed through a scanning electron microscope.

Although the filter element 104 in the foregoing embodiment is provided with the seal plates 112 welded to the opposite ends of the element 104, it is also possible to adopt a structure that does not employ seal plates 112 as described below.

Figure 4:
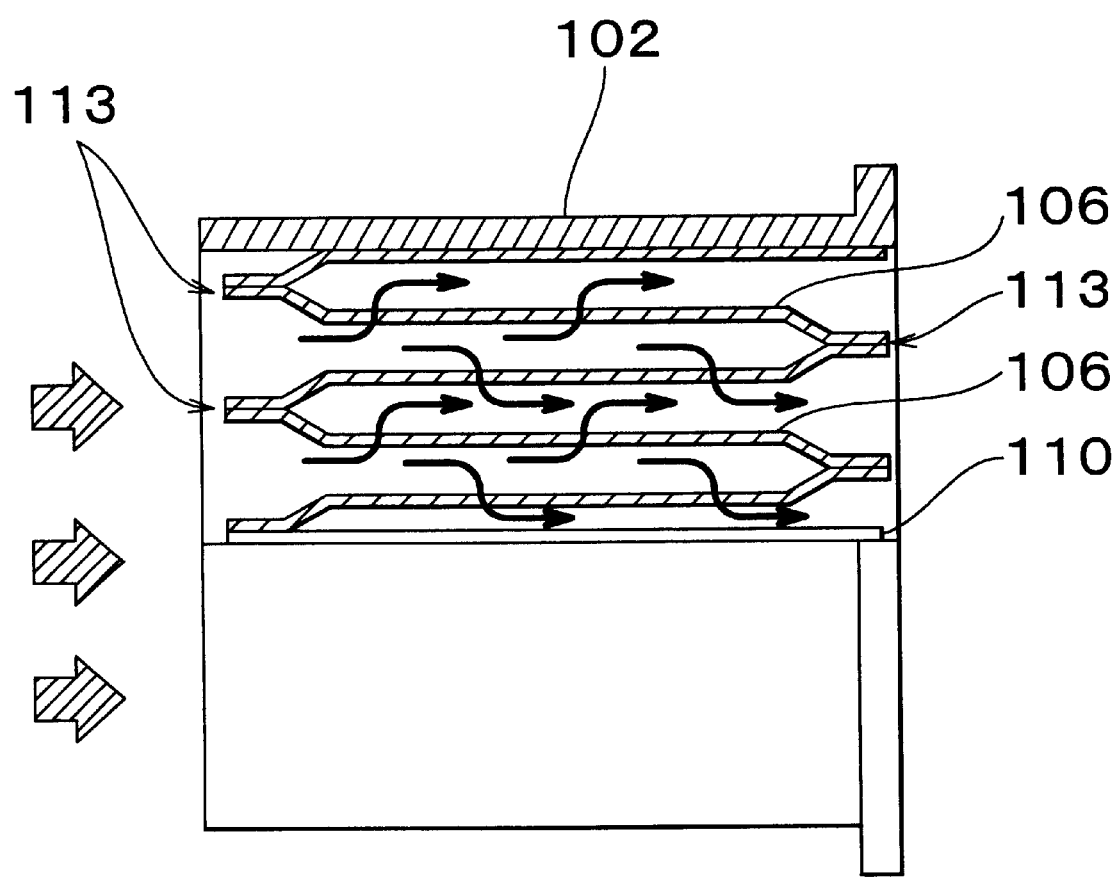
FIG. 4 is a diagram conceptually illustrating how particulates in exhaust gas are collected by a particulate filter in accordance with a modification of the embodiment.

FIG. 4 is a sectional view of an emission control filter 100 equipped with a filter element that does not employ a seal plate. To avoid complicated illustration, the corrugated plate 108 is omitted in FIG. 4. Although in FIG. 3, the seal plates 112 are welded to the two opposite ends of the non-woven fabric 106 in a stagger fashion, it is also possible to weld end portions 113 of non-woven fabric sheets as shown in FIG. 4, instead of welding the seal plates to the end portions. As the seal plates 112 are omitted, this construction allows easy production of the emission control filter 100.

As described above, the non-woven fabric 106 of the emission control filter 100 is able to trap carbon-containing particulates from exhaust gas within the non-woven fabric 106 in a three-dimensionally dispersed state. Therefore, when a certain amount of particulates is collected, the particulates spontaneously will ignite and burn. Therefore, the emission control filter 100 of this embodiment is able to automatically recover the filter without any special operation, for example, an operation of intentionally increasing the exhaust gas temperature. In this specification, the aforementioned function of the emission control filter 100 in this embodiment is termed "spontaneous regeneration function". Although the mechanism of the "spontaneous regeneration function" has not been perfectly elucidated, a presently speculated mechanism will be briefly described.

B-1-3. Mechanism of Removing Carbon Containing Suspended Particulate

Figure 5:
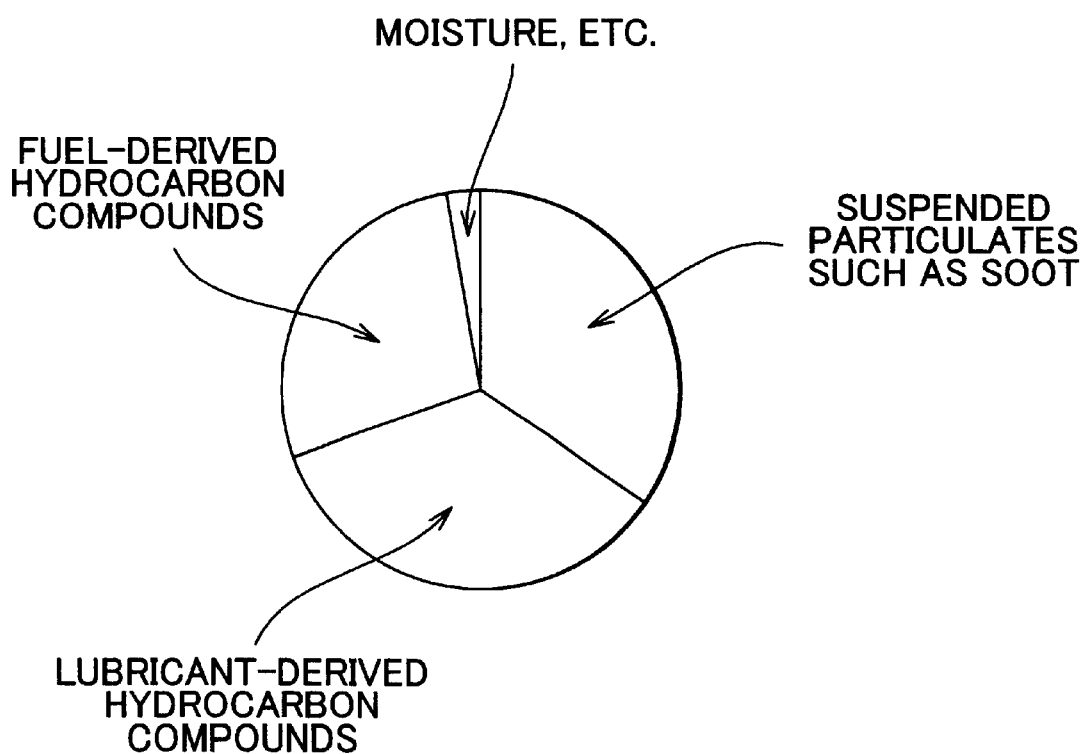
FIG. 5 is a diagram illustrating a composition of carbon-containing suspended particulates, hydrocarbon compounds, etc. contained in exhaust gas from a diesel engine.

Exhaust gas from diesel engines is known to contain carbon-containing suspended particulates, hydrocarbon compounds, etc., at proportions indicated in FIG. 5. Roughly speaking, the exhaust gas contains carbon-containing suspended particulates such as soot and the like, hydrocarbon compounds derived from fuel, and hydrocarbon compounds derived from lubricating oil, at approximately equal proportions. It is said that the carbon-containing suspended particulates, such as sooth and the like, normally do not burn despite an oxygen-containing exhaust gas atmosphere if the temperature is below 550° C. In contrast, the fuel or lubricant-derived hydrocarbon compounds can undergo an oxidative reaction even at temperature below 550° C. as long as oxygen is supplied.

The emission control filter 100 of this embodiment collects suspended particulates and hydrocarbon compounds from exhaust gas in such a fashion that suspended particulates and hydrocarbon compounds are three-dimensionally dispersed within the non-woven fabric. Therefore, the collected hydrocarbon compounds are in such a state that the compounds can be sufficiently supplied with oxygen from exhaust gas. Depending on the exhaust gas temperature, the hydrocarbon compounds start a slow oxidative reaction (exothermic reaction), thereby gradually raising the filter temperature and accumulating intermediate products that are highly reactive. As a result, the filter temperature rises to or above 550° C. when certain amounts of suspended particulates and hydrocarbon compounds have been collected by the filter. It is now possible to entirely burn the particulates and the hydrocarbon compounds in the filter.

Figure 6A:
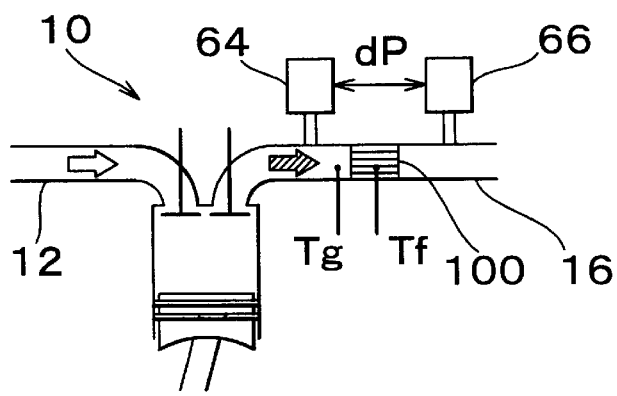
FIGS. 6A to 6C are diagrams conceptually illustrating how the particulates collected by the particulate filter of this embodiment are burned.
Figure 6B:
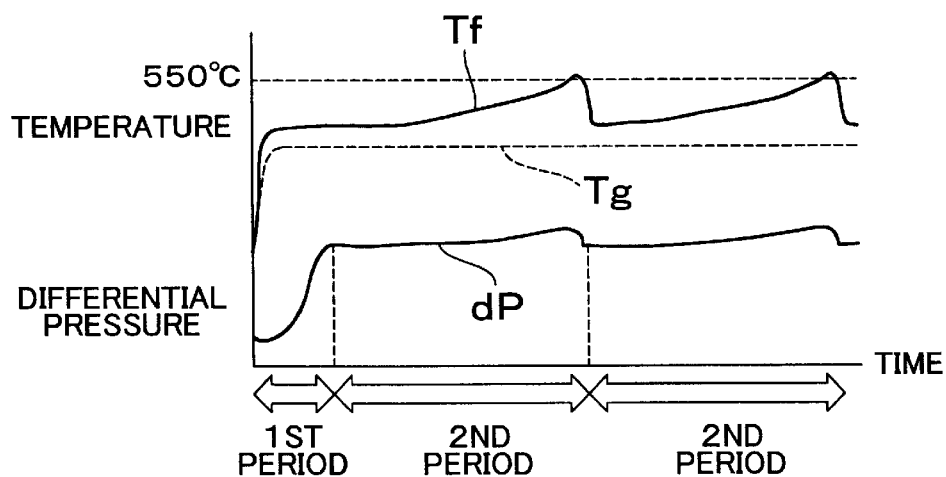
Figure 6C:
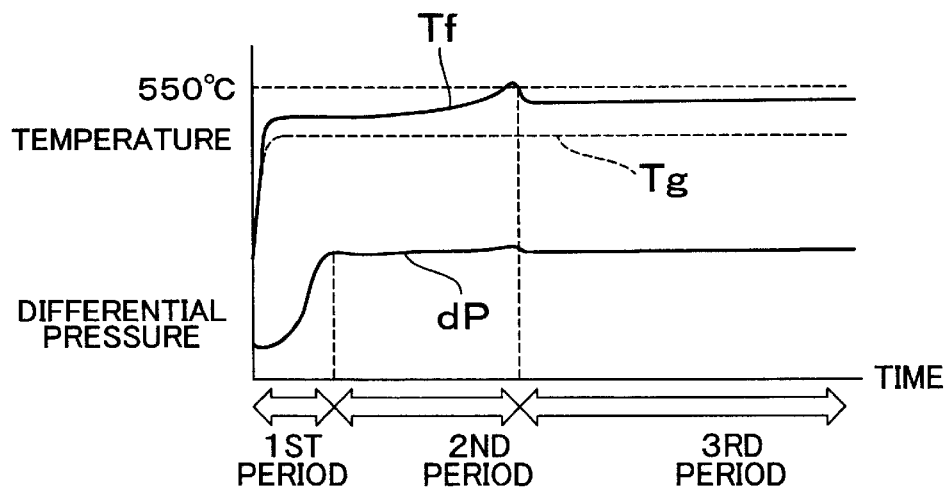

FIGS. 6A to 6C are diagrams conceptually illustrating how the emission control filter 100 of this embodiment spontaneously regenerates. FIG. 6A schematically illustrates the emission control filter 100 disposed within the exhaust pipe 16 of the diesel engine 10. FIG. 6B is a diagram that conceptually indicates results obtained by measuring the filter temperature Tf, the exhaust gas temperature Tg of exhaust gas flowing into the filter, and the differential pressure dP across the filter, while operating the diesel engine 10 in a certain condition.

If the operation of the diesel engine 10 is started, the exhaust gas temperature Tg and the filter temperature Tf immediately rise to steady temperatures. Due to the aforementioned dynamic pressure of exhaust gas on the emission control filter 100, the filter temperature Tf is higher than the exhaust gas temperature Tg. The temperature difference between the filter temperature Tf and the exhaust gas temperature Tg varies depending on various conditions, such as engine operation conditions and the like. In many cases under a normal operation condition, the exhaust filter temperature Tf is higher than the exhaust gas temperature Tg by about 50° C. to 100° C.

If the emission control filter 100 is new, the differential pressure dP across the filter gradually increases during an early period, and then becomes stable at a constant value. The differential pressure across the filter stabilizes at a certain value because the emission control filter 100 of this embodiment collects particulates suspended in exhaust gas not only on the filter surface, but also within the filter in a three-dimensional fashion. The value at which the differential pressure stabilizes varies mainly depending on the design specifications of the filter. In many representative cases, the value is about three to four times the differential pressure that occurs when the filter is new. For easier description, the period from the start of operation of the diesel engine 10 to the stabilization of the differential pressure across the filter will be termed "first period".

If the diesel engine 10 is operated for some time after the differential pressure across the filter stabilizes, the filter temperature Tf begins to slowly rise whereas the exhaust gas temperature Tg does not change as indicated in FIG. 6B. The deviation of the filter temperature Tf from the exhaust gas temperature Tg gradually increases, and eventually reaches about 550° C. During this period, the differential pressure dP across the filter tends to slightly increase due to collection of suspended particulates, such as sooth and the like, and hydrocarbon compounds in the filter. However, in some cases, a significant increase in the differential pressure dP across the filter cannot be measured.

When the filter temperature Tf rises to about 550° C., the particulates, such as soot and the like, collected by the filter start to burn. After the collected particulates are entirely burned, the filter temperature Tf quickly falls to an initial temperature, that is, a temperature determined by adding a temperature increase caused by the dynamic pressure on the filter to the exhaust gas temperature Tg. If an increase in the differential pressure dP across the filter caused by collection of soot and the like from exhaust gas is detectable, a decrease in the differential pressure dP can be detected at the time of combustion of soot and the like in the filter. In FIG. 6B, fluctuations in the differential pressure are exaggeratedly indicated in order to facilitate the understanding of the diagram. As indicated, during a period following the end of the first period, the filter temperature Tf gradually deviates from the exhaust gas temperature Tg, and falls to the temperature determined by adding the dynamic pressure-caused temperature increase to the exhaust gas temperature Tg. This period following the first period will be termed "second period". In reality, the first period is considerably shorter than the second period. However, in FIGS. 6B and 6C, the first period appears longer than real, in relation to the second period, for reasons in illustration.

Although the filter temperature Tf falls to the initial temperature in response to the end of combustion of soot and the like collected by the emission control filter 100, the filter temperature Tf starts to rise again while the engine is operated. Then, the filter temperature Tf eventually reaches 550° C., so that sooth and the like collected by the filter burn. Thus, the emission control filter is kept in a second period state where the filter alternately undergoes collection and combustion of soot and the like from exhaust gas. What has been described above is a first form of the spontaneous regeneration function of the emission control filter 100.

In a condition of high exhaust gas temperature Tg, a second form of the spontaneous regeneration function appears. FIG. 6C is a diagram conceptually indicating transition of the filter temperature Tf and the differential pressure dP across the filter occurring when the diesel engine 10 is operated under a condition where the exhaust gas temperature is slightly higher (typically, 50° C. higher) than in the condition of FIG. 6B. Results similar to those indicated in FIG. 6C can also be obtained if the hydrocarbon concentration or the sooth concentration in exhaust gas, instead of the exhaust gas temperature, is slightly increased from the level in the condition of FIG. 6B.

In the condition of higher exhaust gas temperature Tg, the filter temperature Tf, after the end of the second period, does not fall to the vicinity of the exhaust gas temperature Tg, but stabilizes at a relatively high temperature, as indicated in FIG. 6C. A period which follows the end of the second period and during which the filter temperature Tf stabilizes at a temperature that is higher than the exhaust gas temperature Tg will be termed "third period". During the third period, the collection of soot and the like and the combustion thereof are expected to locally alternate or simultaneously progress. Thus, in the second form of the spontaneous regeneration function, the collection of suspended particulates and the combustion thereof concurrently occur.

As described above, the emission control filter 100 is able to collect carbon-containing suspended particulates and hydrocarbon compounds from exhaust gas in a dispersed fashion, so that the collected particulates can be spontaneously burned without any special operation. It is considered that the reason why the emission control filter 100 is able to collect particulates, such as soot and the like, is that the emission control filter 100 collects particulates by actively taking up the particulates into the non-woven fabric by a mechanism described below. A presently speculated collection mechanism of the filter will be briefly described below.

Figure 7A:
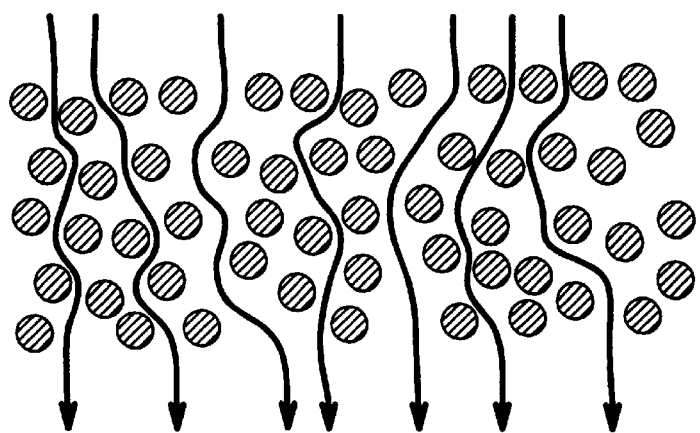
FIGS. 7A to 7C are diagrams conceptually illustrating a mechanism whereby the particulate filter of the embodiment collects carbon-containing suspended particulates in exhaust gas in a dispersed fashion.
Figure 7B:
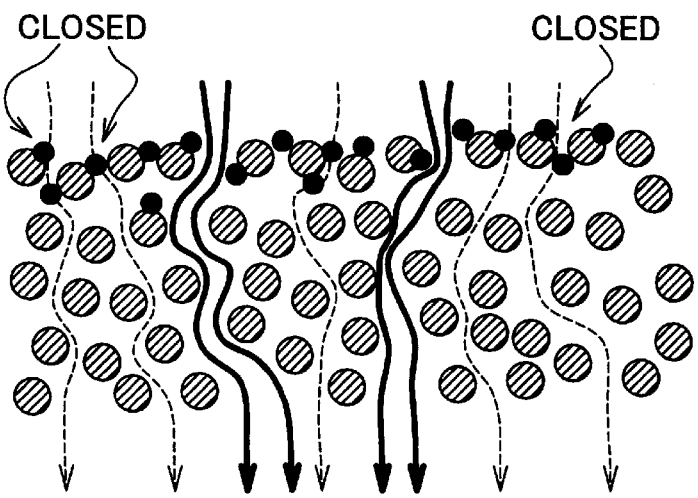
Figure 7C:
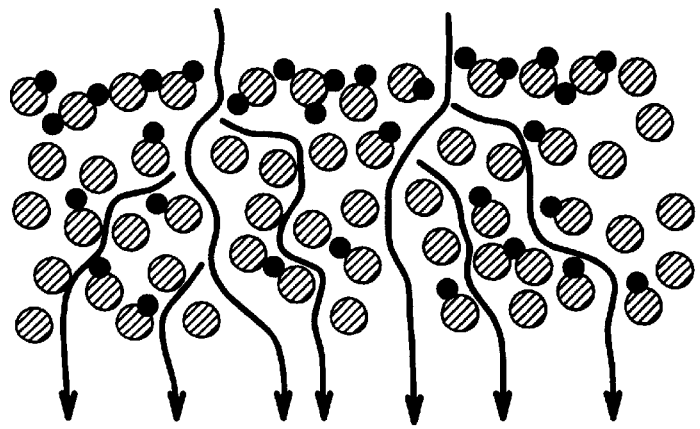

FIGS. 7A to 7C are diagrams conceptually illustrating a sectional structure of a heat-resistant metallic non-woven fabric. In the drawings, each hatched circle indicates a section of a filament of the non-woven fabric. The non-woven fabric is formed by complicated entanglement of a great number of filaments, and has, within the fabric, a great number of three-dimensional passages that are interconnected in a complicated fashion.

FIG. 7A is a conceptual illustration of a sectional structure of a new non-woven fabric. It is assumed that exhaust gas flows from top to bottom. Due to a random distribution of filaments, the non-woven fabric has in a surface thereof opening portions of various sizes. Even small opening portions are sufficiently large for gas molecules in exhaust gas. Therefore, it is considered that exhaust gas substantially uniformly passes through the entire surface of the non-woven fabric. In FIG. 7A, exhaust gas flowing between filaments of the non-woven fabric are schematically indicated by thick-line arrows.

As exhaust gas passes through the non-woven fabric, particulates contained in exhaust gas, such as sooth and the like, are trapped between filaments. Thus, openings in the non-woven fabric surface are gradually closed. Therefore, as indicated in FIG. 7B, small opening portions in the non-woven fabric surface are closed by particulates such as soot, so that flow of exhaust gas concentrates to relatively large opening portion that remain unclosed. As a result, currents of exhaust gas through the non-woven fabric become limited to currents of exhaust gas that start at large opening portions that remain unclosed in the surface. In FIG. 7B, small black circles schematically indicate particulates such as soot.

If exhaust gas concentratedly flows through limited passages as described above, the flow speed thereof increases, so that a great pressure gradient occurs in the passages. This phenomenon may be considered as a phenomenon where a flow of exhaust gas strikes a non-woven fabric filament, and thereby produces great pressure. As described above, the passages formed within the non-woven fabric are interconnected in a complicated fashion. Therefore, if the pressure becomes high in any one of the limited passages, that passage immediately branches into a different passage. Therefore, the differential pressure across the filter does not increase to or about a predetermined value, and is kept within a constant range.

FIG. 7C conceptually illustrates the fashion of major currents branching into other passages. As a result of the branching of currents of exhaust gas within the non-woven fabric, carbon-containing suspended particulates contained in exhaust gas, such as soot and the like, are collected by the entire interior of the non-woven fabric. If a site within the non-woven fabric is closed by soot, a branch through a different passage is immediately formed since passages are three-dimensionally interconnected in a complicated manner. That is, if a site in the non-woven fabric is closed by soot or the like, passages automatically change so that exhaust gas flows through a new passage. Thus, the filter collects soot and the like in a dispersed state.

As described above, the emission control filter 100 has the spontaneous regeneration function, and is capable of causing spontaneous combustion of the suspended particulates and the hydrocarbon compounds collected from exhaust gas, without a need to perform a special operation. Although the emission control filter 100 employs the metallic non-woven fabric 106 to collect suspended particulates from exhaust gas, the non-woven fabric does not need to be made of a metal. For example, a ceramic filter, such as a cordierite-made honeycomb filter or the like, will achieve substantially the same spontaneous regeneration function as that of the filter of the embodiment provided that the ceramic filter has a pore diameter distribution equivalent to that of the filter of the embodiment.

B-2. Overview of Engine Control

Figure 8:
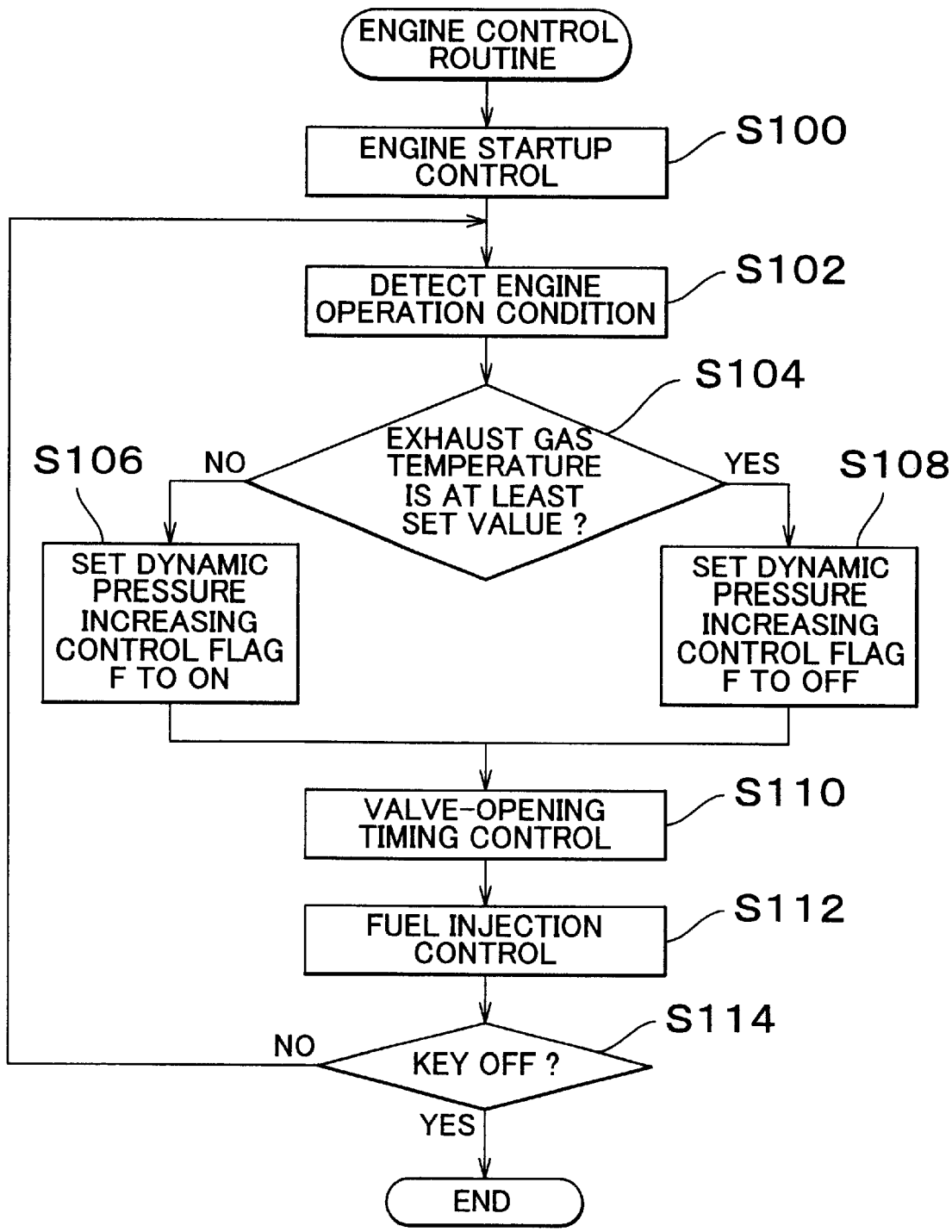
FIG. 8 is a flowchart illustrating an engine control routine of a diesel engine to which the emission control apparatus of the first embodiment is applied.

FIG. 8 is a flowchart illustrating an engine control routine performed by the engine-controlling ECU 30. This control routine is started if an engine startup key is inserted to turn on an electric power supply.

If the turning of the inserted key to a startup position is detected, the engine-controlling ECU 30 starts an engine startup control (step S100). In this operation, the engine-controlling ECU 30 starts the engine by injecting fuel at appropriate timing while cranking the engine via a starter. For the startup of the engine, the engine-controlling ECU 30 detects the intake temperature and the engine water temperature. If the temperature is so low that the startup of the engine is difficult, the intake air and the combustion chambers are appropriately heated by a heater. As injected fuel burns within the combustion chambers, great torque is produced so that the engine rotation speed increases. Then, the engine-controlling ECU 30 detects that the engine rotation speed reaches a predetermined rotation speed, and then ends the engine startup control.

After ending the engine startup control, the engine-controlling ECU 30 detects an engine operation condition (step S102). Major parameters that determine the engine operation condition are the engine rotation speed Ne and the degree of accelerator pedal depression θac. Other subsidiary parameters used include the intake air temperature, the engine cooling water temperature, the fuel temperature, the intake pressure, etc. In step S102, these parameters are detected. In this embodiment, if the temperature of exhaust gas flowing into the emission control filter 100 becomes low, a dynamic pressure increasing control described below is performed to raise the filter temperature. In step S102, the temperature of exhaust gas upstream of the emission control filter 100 is measured.

After detecting the engine operation conditions, the engine-controlling ECU 30 determines whether the exhaust gas temperature upstream of the emission control filter 100 is greater than or equal to a predetermined temperature (step S104). The predetermined temperature is set at a suitable value for each diesel engine 10 by an experimental technique. Typically, the predetermined temperature may be 150° C. to 350° C. More preferably, the temperature may be about 200° C.

If the exhaust gas temperature is below the predetermined temperature ("NO" at step S104), the engine-controlling ECU 30 sets a dynamic pressure increasing control flag F for indicating that the dynamic pressure increasing control is to be performed, to an "ON" state (step S106). The dynamic pressure increasing control is a control of raising the filter temperature by increasing the dynamic pressure of exhaust gas on the emission control filter 100. A specific method for increasing the dynamic pressure of exhaust gas will be described later. A predetermined address in the RAM provided in the engine-controlling ECU 30 is allocated for data that indicates the state of control of the engine. A bit at a predetermined position in this address is allocated to the dynamic pressure increasing control flag F. In step S106, this bit is set to a high-impedance state. Conversely, if the exhaust gas temperature is higher than or equal to the predetermined temperature ("YES" at step S104), the dynamic pressure increasing control flag F is set to an "OFF" state (step S108). Specifically, a bit at a predetermined position in the data that indicates the state of control of the engine is set to a low-impedance state.

After setting the dynamic pressure increasing control flag F to an appropriate state, the engine-controlling ECU 30 starts a valve-opening timing control (step S110). As described above, the diesel engine 10 of this embodiment is equipped with a variable valve timing mechanism, whereby the opening timing and the closing timing of the exhaust valves can be changed. Specifically, the combination of the opening timing and the closing timing of the exhaust valves can be varied between the case where the dynamic pressure increasing control is performed and the case where the dynamic pressure increasing control is not performed (i.e., the case where a normal operation is performed). Therefore, in step S110, the engine-controlling ECU 30 executes a process of setting the opening timing and the closing timing of the exhaust valves. The variable valve timing mechanism and the content of the valve-opening timing control will be described later.

Subsequently to the valve-opening timing control, the engine-controlling ECU 30 starts a fuel injection control (step S112). The fuel injection control is a control of injecting an appropriate amount of fuel at an appropriate timing in accordance with the engine operation condition. This control will be briefly described below. First, a basic amount of fuel injected and a basic fuel injection timing are computed based on the engine rotation speed Ne and the degree of accelerator pedal depression θac. More specifically, the ROM provided in the engine-controlling ECU 30 stores the basic amount of fuel injection and the basic fuel injection timing in the form of a map with respect to the engine rotation speed Ne and the degree of accelerator pedal depression θac. By referring to this map, appropriate values in accordance with the engine operation condition are acquired. Subsequently, the values are subjected to a correction factoring in the effects of the intake air temperature, the engine cooling water temperature, the fuel temperature, etc., so as to determine an optimal amount of fuel injection and an optimal fuel injection timing in accordance with the engine operation condition. The various correction factors, including the intake air temperature, the engine cooling water temperature, etc., are also stored in the ROM of the engine-controlling ECU 30 in the form of maps. By referring to these maps, the engine-controlling ECU 30 acquires a basic amount of fuel injection, a basic fuel injection timing, and various correction factors. The engine-controlling ECU 30 computes the optimal amount of fuel injection and the optimal fuel injection timing based on the basic amount of fuel injection, the basic fuel injection timing and the various correction factors, and accordingly controls the fuel supply pump 18 and the fuel injection valve 14.

The optimal amount of fuel injection and the optimal fuel injection timing differ between the case where the dynamic pressure increasing control is performed and the case where the dynamic pressure increasing control is not performed. Therefore, two sets of maps, that is, a set of maps for the case where the dynamic pressure increasing control is performed and a set of maps for the case where the dynamic pressure increasing control is not performed, that is, the normal control is performed, are pre-stored in the engine-controlling ECU 30. By referring to suitable maps in accordance with the state of the dynamic pressure increasing control flag F, the engine-controlling ECU 30 is able to compute the optimal amount of fuel injection and the optimal fuel injection timing.

After ending the fuel injection control as described above, the engine-controlling ECU 30 detects whether the inserted startup key has been returned to an "OFF" position (step S114). If the key has not been returned to the "OFF" position, the engine-controlling ECU 30 goes back to step S102, and performs the series of processes again. Therefore, the engine is always optimally controlled in accordance with the operation condition. If the dynamic pressure increasing control flag F is in the "ON" state, the dynamic pressure increasing control is performed as a whole through execution of the predetermined valve-opening timing control and the fuel injection control in accordance with the "ON" state of the dynamic pressure increasing control flag F. As a result, the dynamic pressure on the emission control filter 100 increases so that the filter temperature rises. Thus, the combustion of carbon-containing particulates trapped by the emission control filter 100 is accelerated. The dynamic pressure increasing control will be described below.

B-3. Dynamic Pressure Increasing Control of First Embodiment

As described above, the diesel engine 10 equipped with the emission control apparatus of the first embodiment raises the dynamic pressure on the emission control filter by performing the valve-opening timing control and the fuel injection control. The valve-opening timing control for increasing the dynamic pressure will first be described, and then the fuel injection control will be described.

Figure 9A:
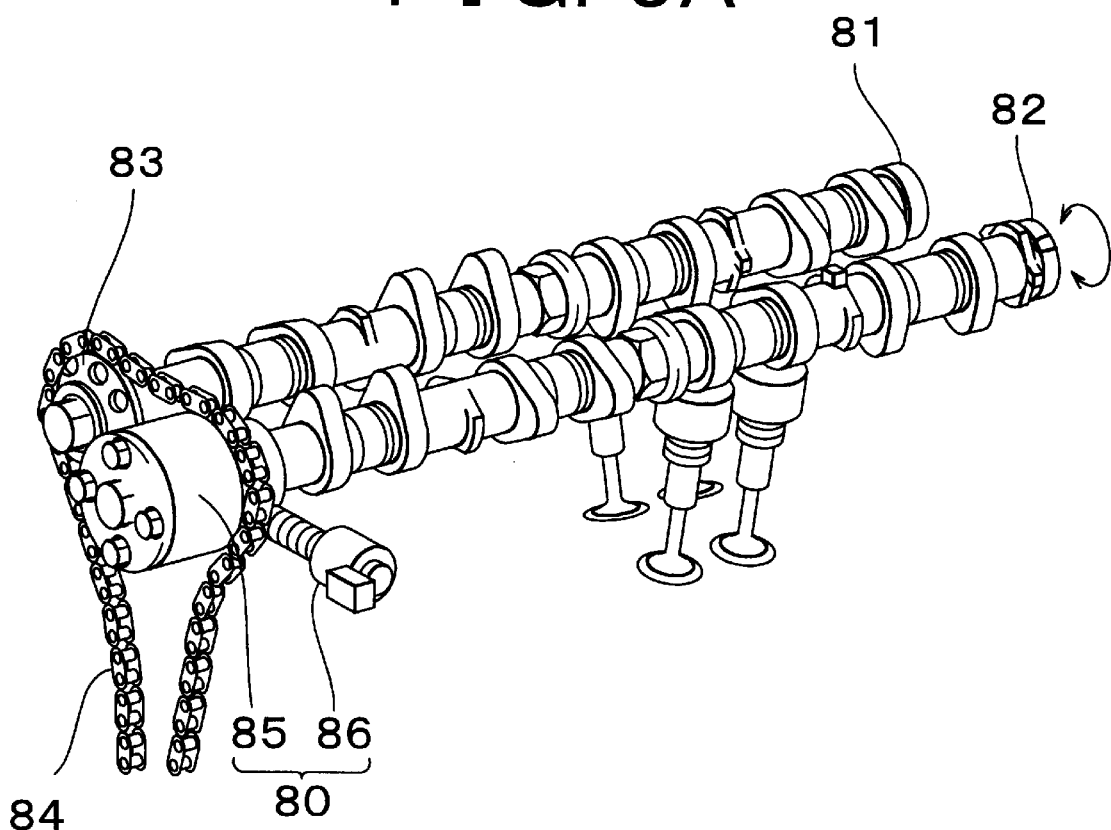
FIGS. 9A and 9B are diagrams conceptually illustrating an overview of a variable valve timing mechanism.
Figure 9B:
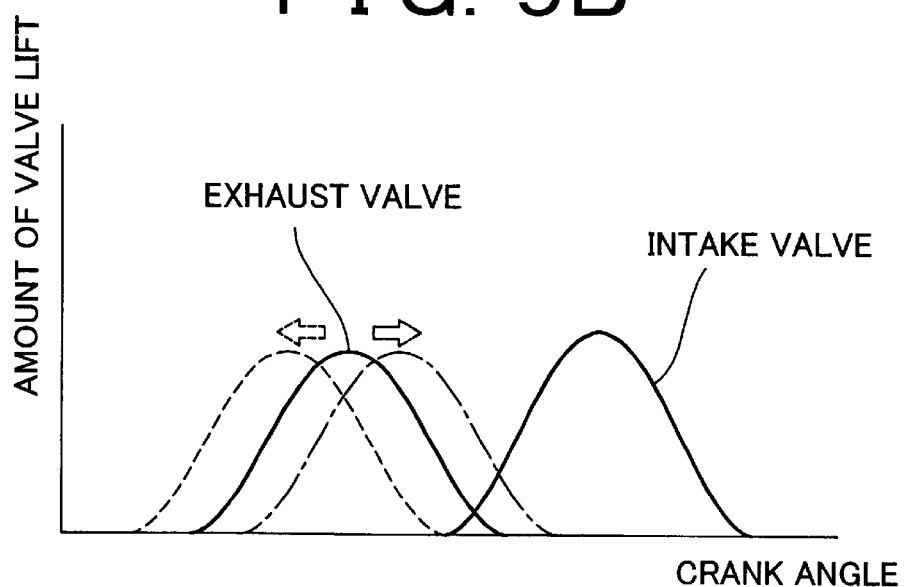

FIGS. 9A and 9B are diagrams illustrating an overview of a variable valve timing mechanism 80 installed for the diesel engine 10 of this embodiment. FIG. 9A illustrates an overall structure of the mechanism. FIG. 9B is a diagram conceptually indicating an operation of the variable valve timing mechanism. First, the variable valve timing mechanism 80 will be briefly described with reference to FIGS. 9A and 9B.

In this embodiment, the variable valve timing mechanism 80 is incorporated into a valve drive mechanism (mechanism for driving the intake valves and the exhaust valves in accordance with rotation of the crankshaft). Therefore, the valve drive mechanism of the diesel engine 10 will first be described briefly.

The diesel engine 10 of this embodiment has an intake camshaft 81 for driving the intake valves, and an exhaust camshaft 82 for driving the exhaust valves. A distal end of each camshaft is provided with a sprocket 83. The sprockets 83 are engaged with a chain 84. The chain 84 is connected to a crankshaft (not shown) of the diesel engine 10. As the crankshaft rotates, rotation thereof is transferred to the intake camshaft 81 and the exhaust camshaft 82, thereby driving the intake valves and the exhaust valves. If the crankshaft, the intake camshaft 81 and the exhaust camshaft 82 are mounted so as to have appropriate phases, it becomes possible to drive the intake valves and the exhaust valves at appropriate timing in accordance with rotation of the crankshaft.

The variable valve timing mechanism 80 includes a controller 85 and an oil control valve 86. The controller 85 is provided on the sprocket 83 of the exhaust camshaft 82. The controller 85 has a built-in hydraulic mechanism, whereby the phase difference between the exhaust camshaft 82 and the sprocket 83 can be changed. More specifically, two oil pressure chambers for advancing and retarding timing are formed within the controller 85. By applying oil pressure to the timing-advancing oil pressure chamber, the phase of the exhaust camshaft 82 can be changed in a timing advancing direction relative to the sprocket 83. Conversely, by applying oil pressure to the timing-retarding oil pressure chamber, the phase of the exhaust camshaft 82 can be changed in a timing retarding direction relative to the sprocket 83. The oil control valve 86 performs such an oil pressure switch based on the control of the engine-controlling ECU 30. The present phase difference can be maintained by closing the oil control valve 86 so as to prevent oil relief from the advancing-side and oil relief from the retarding-side oil pressure chamber.

FIG. 9B conceptually indicates the fashion of controlling the opening timing of the exhaust valves by changing the oil pressure. Since the sprockets 83 and the crankshaft are fitted to the chain 84, the phase difference therebetween is fixed. Therefore, if the phase of the exhaust camshaft 82 advances with respect to the sprocket 83, the phase thereof with respect to the crankshaft also advances. In this manner, the exhaust valve-opening timing can be advanced as indicated by a broken line in FIG. 9B. Conversely, if the phase of the exhaust camshaft 82 is retarded with respect to the crankshaft, the exhaust valve-opening timing is retarded as indicated by a one-dot chain line in FIG. 9B.

Although in this embodiment the variable valve timing mechanism 80 is provided only on the exhaust side, it is also possible to provide a variable valve timing mechanism on the intake side. Therefore, by optimally controlling the opening timing and the closing timing of the intake valves in accordance with the engine operation condition, the engine output and the fuel consumption efficiency can be improved, and the concentration of air pollutants in exhaust gas can be reduced.

The emission control apparatus of this embodiment increases the dynamic pressure on the emission control filter 100 by advancing the exhaust valve-opening timing via the variable valve timing mechanism 80 as described above. A principle behind an increase in the dynamic pressure caused by advancing the exhaust valve-opening timing will be explained with reference to FIG. 10.

Figure 10:
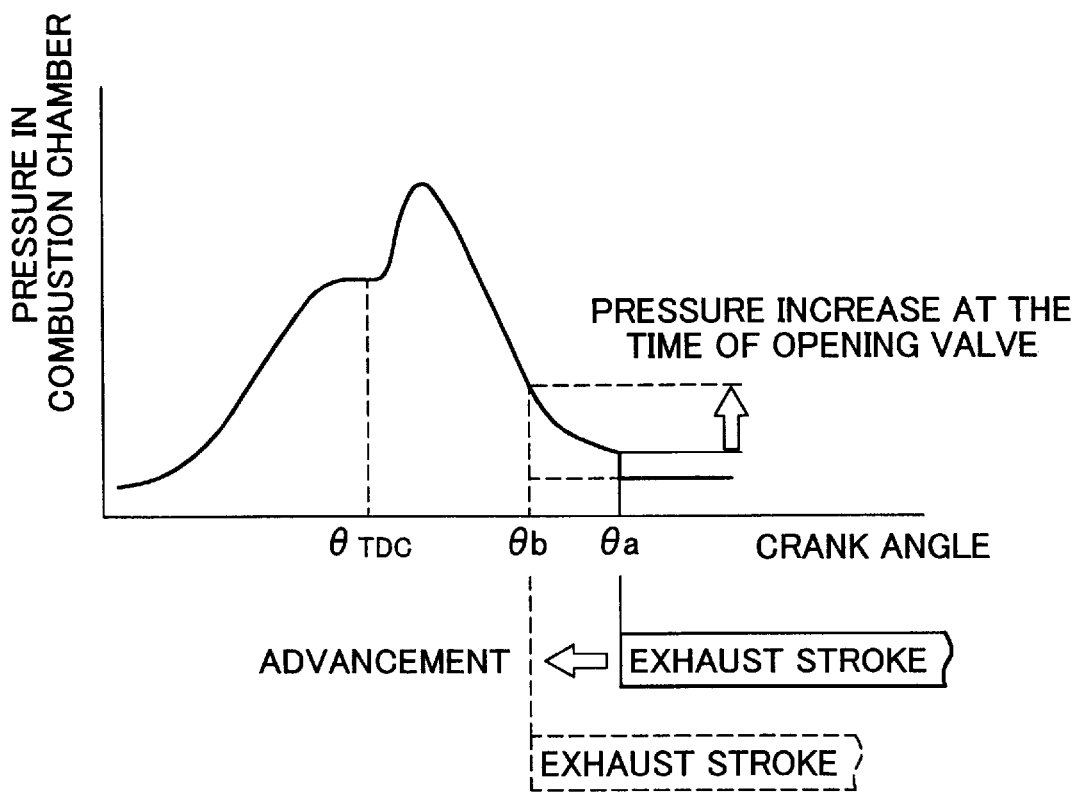
FIG. 10 is a diagram indicating a principle whereby an advancement of the exhaust valve-opening timing increases the dynamic pressure on the emission control filter in the emission control apparatus of the first embodiment.

FIG. 10 is a diagram conceptually indicating changes in the pressure within the combustion chamber at and around the exhaust valve-opening timing. In the diagram, the horizontal axis indicates the crank angle, and θTDC indicates the crank angle of the compression-stroke top dead center of a piston. As indicated, as the crank angle approaches θTDC, the piston ascends so that the pressure in the combustion chamber rises. After θTDC, the piston descends. However, the pressure in the combustion chamber further rises due to combustion of fuel injected near the crank angle θTDC. After the combustion ends, the pressure in the combustion chamber starts to decrease at a certain time point. After this time point, the pressure in the combustion chamber decreases together with the crank angle. Internal combustion engines cause high pressure by burning fuel in the combustion engine, and extracts force that pushes the piston due to the pressure, and outputs the force as torque. As the piston descends while torque is extracted, the pressure in the combustion chamber also decreases. At a timing near the dead bottom position of the piston, the exhaust valves are opened. In FIG. 10, the exhaust valves are opened at a crank angle θa. Then, the exhaust gas within the combustion chamber instantaneously expands and is let out via the exhaust valves. In response, the pressure in the combustion chamber instantaneously falls to the pressure in the exhaust pipe as indicated by a solid line in FIG. 10.

If the exhaust valve-opening timing is advanced from θa to θb, the exhaust valves are opened at a timing when the pressure in the combustion chamber is still high, and therefore, exhaust gas is discharged via the exhaust valves with an increased momentum. The flow speed of exhaust gas is thus increased, so that the dynamic pressure on the emission control filter 100 correspondingly increases. As described above, the emission control apparatus of the embodiment is able to increase the dynamic pressure on the emission control filter 100 by advancing the exhaust valve-opening timing as needed. In FIG. 10, the amount of increase in the combustion chamber pressure at the exhaust valve-opening timing caused by advancing the exhaust valve-opening timing is indicated by an outlined arrow.

As described above, the emission control apparatus of the embodiment increases the dynamic pressure on the emission control filter 100 by performing the fuel injection control in addition to the valve-opening timing control. Described below will be a control of increasing the dynamic pressure by performing the fuel injection control.

Figure 11:
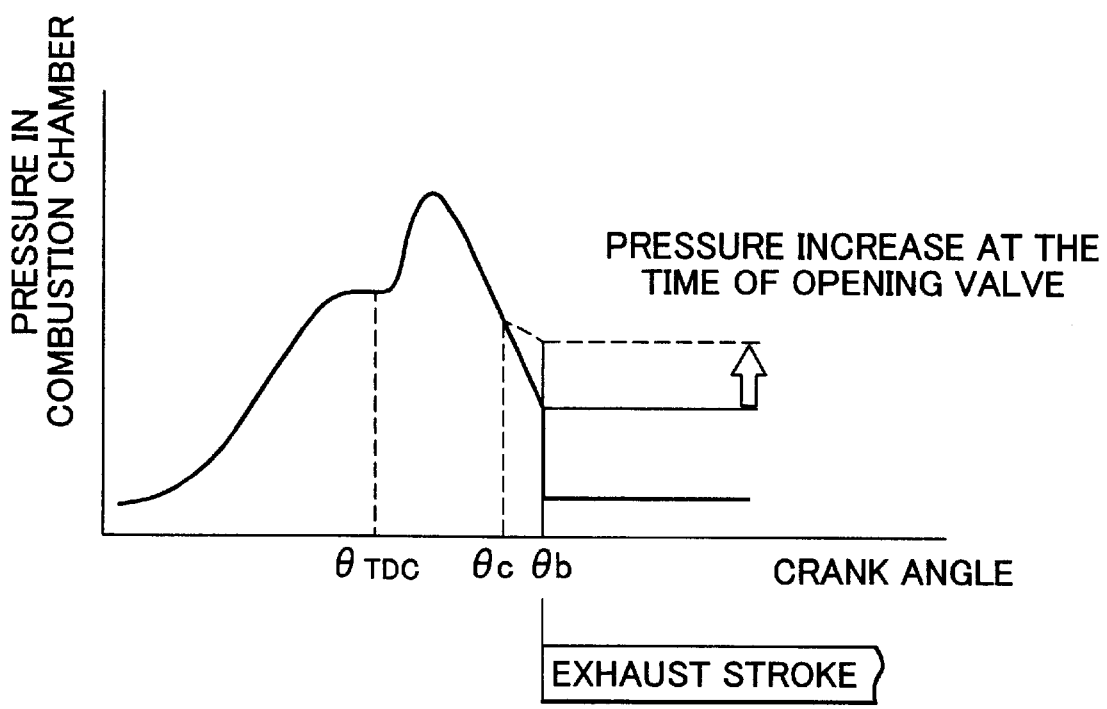
FIG. 11 a diagram indicating a principle whereby execution of post-injection increases the dynamic pressure on the emission control filter in the emission control apparatus of the first embodiment.

FIG. 11 is a diagram indicating pressure changes in the combustion chamber with the crank angle indicated by the horizontal axis. In FIG. 11, the exhaust valve-opening timing is an advanced timing. The emission control apparatus of this embodiment performs generally termed post-injection in order to increase the dynamic pressure on the emission control filter 100. The post-injection refers to injection of an additional amount of fuel during the expansion stroke of the engine in addition to the normal fuel injection. In the embodiment indicated in FIG. 11, an additional amount of fuel is injected at a timing of crank angle θc. Due to the combustion of the additional fuel, the in-combustion chamber pressure increases as indicated by a broken line in FIG. 11. As a result, the in-combustion chamber pressure at the exhaust valve-opening timing also increases, so that the dynamic pressure on the emission control filter 100 can be correspondingly increased. In FIG. 11, the amount of increase in the in-combustion chamber pressure at the valve-opening timing caused by execution of the post-injection is indicated by a black solid arrow.

As described above, if the dynamic pressure increasing control flag F is set at the "ON" state, the emission control apparatus of the embodiment advances the exhaust valve-opening timing, and performs the post-injection, so as to considerably increase the in-combustion chamber pressure at the exhaust valve-opening timing and therefore considerably increase the dynamic pressure on the emission control filter 100. Therefore, even in an engine operation condition where the temperature of exhaust gas discharged from the diesel engine 10 is low so that it is difficult to burn carbon-containing particulates collected on the emission control filter 100, an increase in the dynamic pressure accomplished as described above will raise the filter temperature so as to accelerate the combustion of particulates. Thus, the clogging of the filter can be avoided.

Although in the foregoing fuel injection control, the dynamic pressure is increased by performing the post-injection in addition to the main fuel injection operation of injecting fuel at normal timing, it is also possible to retard the timing of the main fuel injection instead of performing the post-injection. If the timing of the main fuel injection is retarded, the thermal efficiency of the internal combustion engine decreases, and therefore the in-combustion chamber pressure at the exhaust valve-opening timing increases. In addition, since it is necessary to inject an increased amount of fuel corresponding to the decrease in thermal efficiency, the in-combustion chamber pressure further increases. If the in-combustion chamber pressure at the exhaust valve-opening timing is increased in this manner, exhaust gas is discharged via the exhaust valves with great momentum, and the dynamic pressure on the emission control filter can be increased.

B-4. Modifications

Various modifications are possible regarding the emission control apparatus of the first embodiment. The modifications will be briefly described below.

B-4-1. First Modification

Although in the valve-opening timing control in the first embodiment, the exhaust valve-opening timing is advanced in order to increase the dynamic pressure on the emission control filter 100, the dynamic pressure can also be increased by retarding the exhaust valve-opening timing by at least a predetermined amount. Description will be made with reference to FIG. 12.

Figure 12:
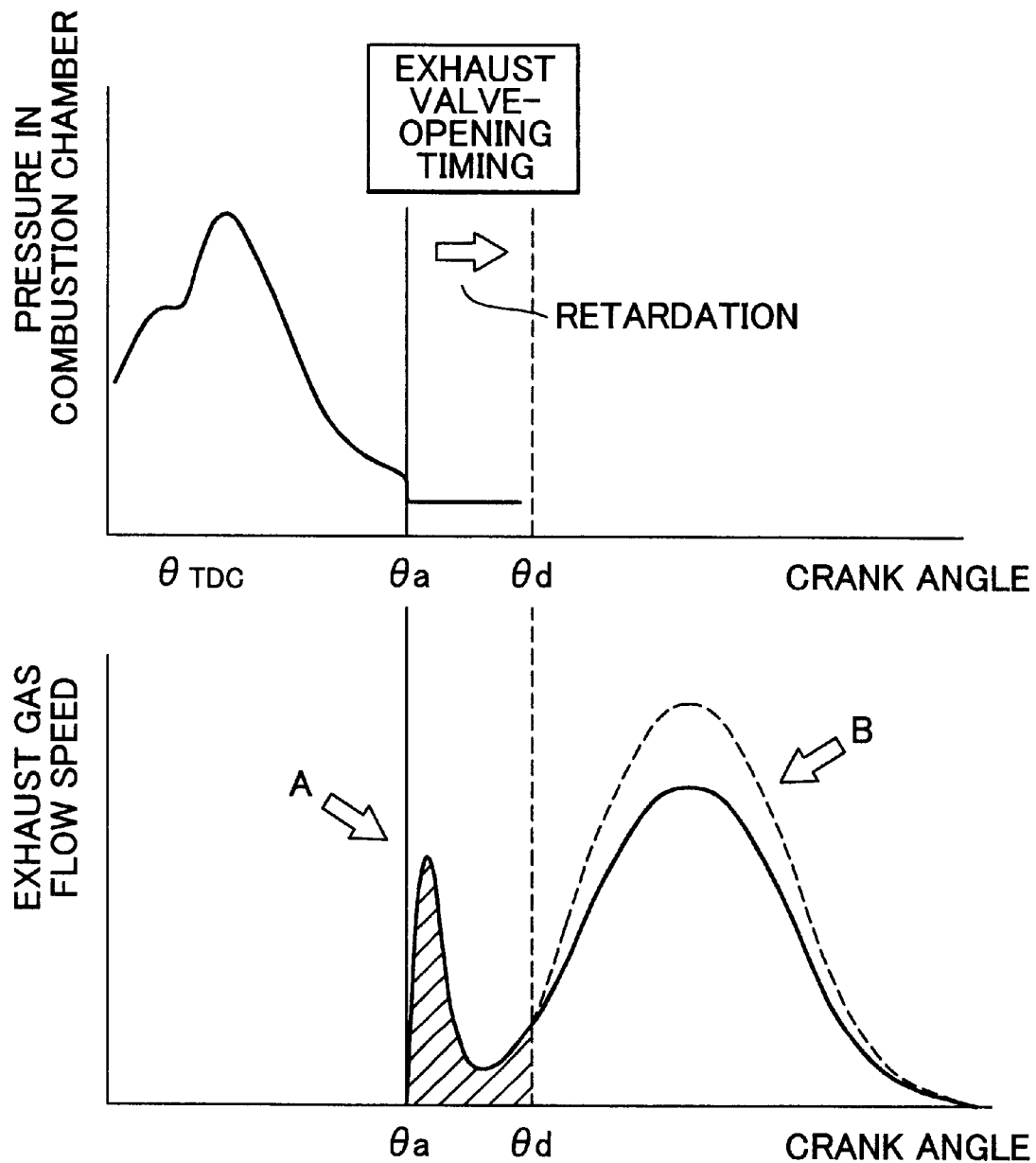
FIG. 12 a diagram indicating a principle whereby a retardation of the exhaust valve-opening timing increases the dynamic pressure on the emission control filter in the emission control apparatus in accordance with a modification of the embodiment.

FIG. 12 is a diagram conceptually indicating how the flow speed of exhaust gas discharged via the exhaust valves changes with the crank angle. For easier understanding, an upper portion of FIG. 12 indicates how the in-combustion chamber pressure changes with the crank angle. As indicated in FIG. 12, the exhaust gas flow speed exhibits two peaks, that is, a first peak that appears immediately after the exhaust valves open (indicated by an arrow A in FIG. 12), and a second peak that appears during an intermediate period within the exhaust stroke (indicated by an arrow B in FIG. 12).

The first peak appears because the in-combustion chamber pressure at the exhaust valve-opening timing is higher than the pressure in the exhaust pipe and therefore high-pressure exhaust gas in the combustion chamber instantaneously expands and jets out via the exhaust valves. That is, due to an increased in-combustion chamber pressure caused by combustion of injected fuel, the in-combustion chamber pressure remains higher than the in-exhaust pipe pressure even at the timing when the piston descends and the exhaust valves open, as indicated in the upper portion of FIG. 12. Therefore, the high-pressure exhaust gas in the combustion chamber jets out via the exhaust valves simultaneously with the opening of the exhaust valves. Thus, the first peak appears.

The second peak appears based on exhaust gas being pushed out of the cylinder by ascent of the piston. That is, even after exhaust valves open and exhaust gas jets out of the combustion chamber, the cylinder is still filled with exhaust gas. Therefore, the exhaust gas flows out via the exhaust valves as the piston ascends. Since the ascending speed of the piston becomes greatest during an intermediate period of the exhaust stroke, the flow speed of exhaust gas discharged out exhibits the peak during the intermediate period of the exhaust stroke.

A case where the exhaust valve-opening timing is retarded from the crank angle θa that is the normal valve-opening timing to a crank angle θd as indicated in FIG. 12 will be considered below. Then, the amount of exhaust gas corresponding to the first peak is not discharged but is held within the cylinder because the exhaust valves are not open. In FIG. 12, a hatched area corresponds to the amount of exhaust gas held within the cylinder in the aforementioned manner. Since the amount of exhaust gas within the cylinder thus increases, the second peak appearing due to the ascent of the piston corresponding increases. In FIG. 12, the flow speed of exhaust gas obtained by retarding the exhaust valve-opening timing is indicated by a broken line.

In the first modification, if the dynamic pressure increasing control flag F is set at the "ON" state, it is also possible to increase the dynamic pressure on the emission control filter 100 by retarding the exhaust valve-opening timing as described above in the valve-opening timing control process (step S110 in FIG. 8).

B-4-2. Second Modification

In the foregoing first embodiment, the temperature of exhaust gas upstream of the emission control filter 100 is compared with a predetermined temperature. If the upstream exhaust gas temperature is lower than the predetermined temperature, the dynamic pressure control is performed so as to increase the filter temperature. The determination as to whether the filter temperature needs to be increased may also be accomplished by employing a method other than the aforementioned method based on the exhaust gas temperature.

Figure 13:
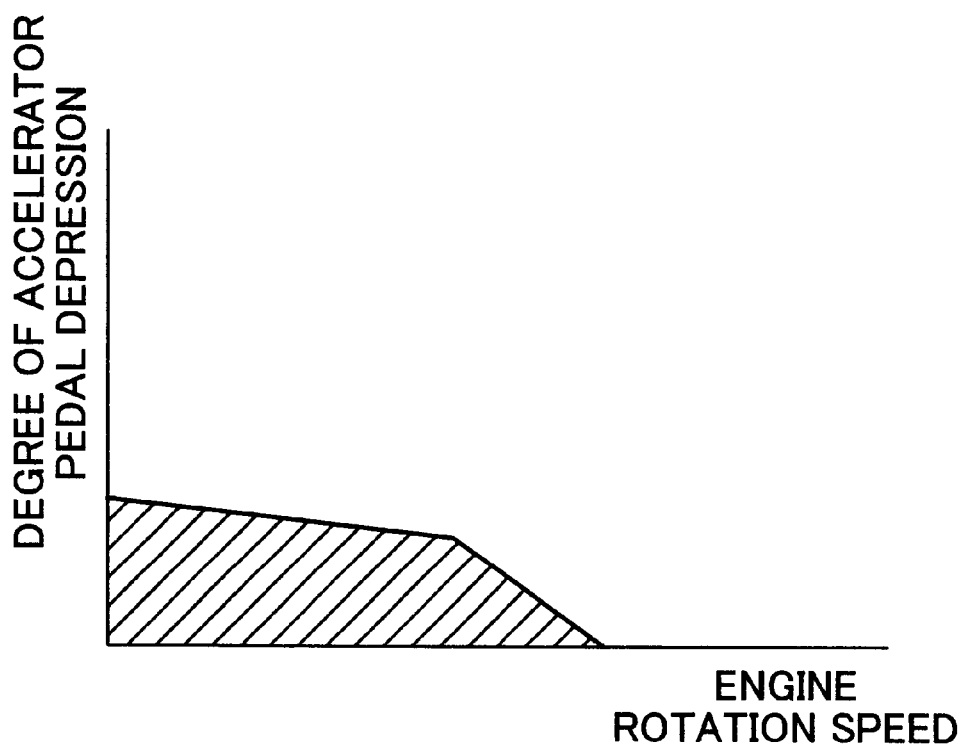
FIG. 13 is a diagram illustrating how the determination as to whether there is a need to increase the emission control filter temperature is made taking the engine operation condition into consideration in the emission control apparatus in accordance with the modification.

For example, if the engine is operated in a steady condition, the exhaust gas temperature is automatically determined by the engine operation condition. Therefore, if the exhaust gas temperature is low and the engine has been continuously operated for at least a predetermined time, it can be determined that the temperature of the emission control filter needs to be raised. Specifically, an operation region where the engine load is low and the exhaust gas temperature is less than or equal to a predetermined temperature is empirically determined beforehand, and is pre-stored in the RAM of the engine-controlling ECU 30. In FIG. 13, a hatched region schematically represents the aforementioned empirically determined region.

If the engine operation condition is detected in the engine control routine (see step S102 in FIG. 8) and the operation condition is within the region indicated in FIG. 13, a time provided in the engine-controlling ECU 30 is set. If the engine has been continuously operated in this region for at least a predetermined time, it is possible to determine that the temperature of exhaust gas flowing into the emission control filter 100 has become low and to determine that there is a need to increase the temperature of the emission control filter 100.

Also, in a case where the engine is operated in the operation region as indicated in FIG. 13 for some time and the exhaust gas temperature becomes low, the temperature of the emission control filter 100 remains high for some time. If the engine has been continuously operated in the region exemplified in FIG. 13 for such a length of time that the temperature of the emission control filter 100 starts to decrease, it is possible to determine that there is a need to increase the temperature of the emission control filter 100, and to start the dynamic pressure increasing control.

Furthermore, it is possible to measure the temperature of exhaust gas flowing into the emission control filter 100 by using the temperature sensor 76, and to determine that there is a need to increase the temperature of the emission control filter 100 if the engine has been continuously operated under a condition that the exhaust gas is less than or equal to a threshold temperature.

C. Second Embodiment

In the foregoing emission control apparatus of the first embodiment, the determination as to whether there is a need to raise the filter temperature is made based on the temperature of exhaust gas flowing into the emission control filter 100 or the temperature of the filter. However, in addition to the exhaust gas temperature, the differential pressure across the emission control filter may be considered in order to determine whether there is a need to increase the filter temperature. Such an emission control apparatus in accordance with a second embodiment will be described below.

C-1. Apparatus Construction

Figure 14:
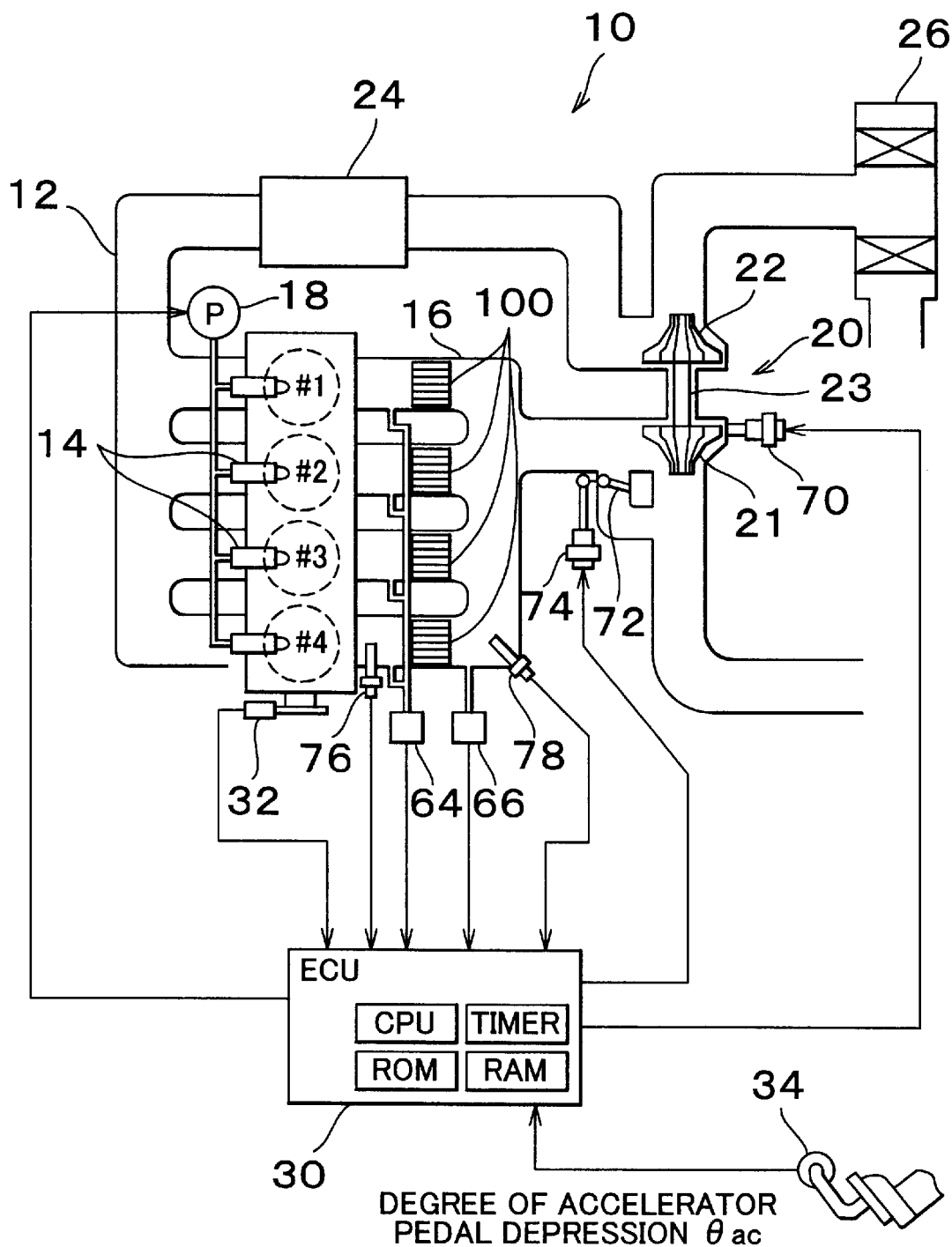
FIG. 14 is a diagram illustrating a construction of a diesel engine to which an emission control apparatus of a second embodiment is applied.

FIG. 14 is a diagram illustrating a construction of a diesel engine 10 to which the emission control apparatus of the second embodiment is applied. The diesel engine of the second embodiment considerably differs from the diesel engine of the first embodiment in that the differential pressure across emission control filters 100 can be detected, and that the temperature of exhaust gas downstream of the emission control filter can also be measured, and that a turbocharger 20 is provided with a variable nozzle mechanism and a waste gate valve. Differences from the first embodiment will be mainly described below.

As in the first embodiment, the turbocharger 20 is provided in an intermediate portion of an exhaust pipe 16 of the diesel engine of the second embodiment. However, the turbocharger 20 in the second embodiment is provided with an actuator 70 that can change the area of opening through which exhaust gas flows into a turbine 21 of the turbocharger 20 (hereinafter, referred to as "turbine opening area"). By suitably controlling the turbine opening area in accordance with the amount of flow of exhaust gas, an appropriate efficiency of the turbocharger 20 can be set.

A bypass valve termed waste gate valve 72 is provided upstream of the turbine 21. Using a waste gate actuator 74, the degree of opening of the waste gate valve 72 is adjusted so as to control the proportion of exhaust gas that bypasses the turbine 21. In this fashion, the performance of the turbocharger 20 can be controlled.

Pressure sensors 64, 66 are provided at upstream and downstream sides of the emission control filters 100, respectively. Outputs of the pressure sensors 64, 66 are input to an engine-controlling ECU 30. From the values measured by the two sensors, the engine-controlling ECU 30 is able to compute the differential pressure across the emission control filters 100. Furthermore, in the second embodiment, a temperature sensor 78 is provided at the downstream side of the emission control filters 100, in addition to a temperature sensor 76 provided at the upstream side of the filters. Therefore, the exhaust gas temperature difference across the emission control filters 100 can be detected.

C-2. Overview of Engine Control

Figure 15:
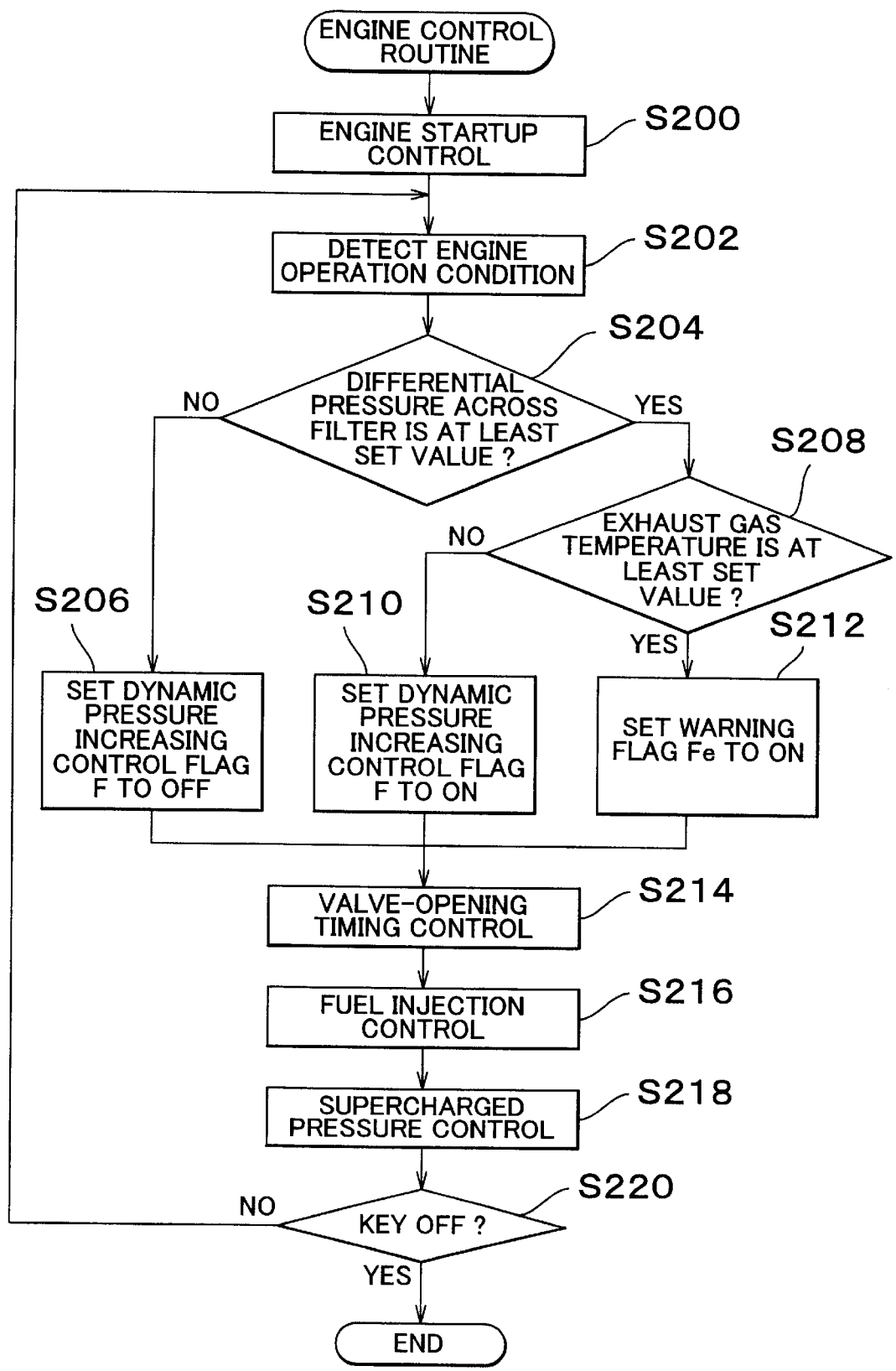
FIG. 15 is a flowchart illustrating an engine control routine of the diesel engine to which the emission control apparatus of the second embodiment is applied.

FIG. 15 is a flowchart illustrating the flow of an engine control routine in the second embodiment. The engine control routine in the second embodiment considerably differs from the routine of the first embodiment illustrated in FIG. 8 in that the differential pressure across the emission control filter is considered and the turbocharger control is performed. Description of the engine control routine of the second embodiment will be made below, mainly focusing on the aforementioned differences.

As in the first embodiment, the engine control routine in the second embodiment begins when an engine startup key is inserted to turn on an electric power supply. If the turning of the inserted key to a startup position is detected, the engine-controlling ECU 30 starts an engine startup control to start up the engine (step S200).

Subsequently, an operation condition of the engine is detected (step S200). In the engine control routine of the second embodiment, the temperature of exhaust gas flowing into the emission control filter 100 and the in-exhaust pipe pressures upstream and downstream of the emission control filter 100 are detected in addition to the engine rotation speed Ne, the degree of accelerator pedal depression θac, the intake air temperature, the engine cooling water temperature, the fuel temperature, the intake pressure, etc. which are detected also in the control routine of the first embodiment. The exhaust gas temperature upstream of the emission control filter 100 is detected by the temperature sensor 76. The in-exhaust pipe pressure upstream of the emission control filter 100 is detected by the pressure sensor 64. The in-exhaust pipe pressure downstream of the emission control filter 100 is detected by the pressure sensor 66.

After detecting the engine operation condition, the engine-controlling ECU 30 computes an across-filter differential pressure from the in-exhaust pipe pressures detected upstream and downstream of the emission control filter 100, and determines whether the differential pressure is greater than or equal to a predetermined threshold value (step S204). As described above with reference to FIG. 6, due to the alternating occurrence of the collection and the combustion of carbon-containing particulates on the emission control filter 100, the value of the differential pressure across the emission control filter 100 is likely to fluctuate to some extent. The threshold value used for the determination in step S204 is a set value that is greater than the differential pressure that occurs during a normal operation.

Although in the description herein, the threshold value of differential pressure is a fixed value, it is also possible to adopt a construction in which suitable threshold values corresponding to engine operation conditions are stored as a map and a threshold value corresponding to the detected engine operation condition is extracted and is compared with the determined differential pressure.

If the across-filter differential pressure is less than the threshold value ("NO" at step S204), it is considered that the spontaneous regeneration function of the emission control filters 100 is normal, and therefore it is determined that there is no need to perform the dynamic pressure increasing control. Then, the dynamic pressure increasing control flag F is set to the "OFF" state (step S206).

If the across-filter differential pressure is greater than the threshold pressure ("YES" at step S204), it is considered that the emission control filters 100 are slightly clogged. Therefore, the engine-controlling ECU 30 determines whether the temperature of exhaust gas flowing into the emission control filters 100 is higher than or equal to a predetermined threshold temperature (step S208). If the exhaust gas temperature is lower than the threshold temperature ("NO" at step S208), the dynamic pressure increasing control flag F is set to the "ON" state (step S210) so as to raise the emission control filter temperature and therefore accelerate the combustion of carbon-containing particulates deposited on the filters.

If the exhaust gas temperature is higher than the threshold temperature ("YES" at step S208), it is considered that the spontaneous regeneration function of the emission control filters 100 is not normally performed, because carbon-containing particulates on the filters have not burned despite the high exhaust gas temperature. Therefore, a warning flag Fe is set to the "ON" state (step S212). In response to the "ON" state of the warning flag Fe, a warning lamp (not shown) is turned on so as to indicate to an engine operating person that the engine needs maintenance. The threshold temperature used for the aforementioned determination is set by an experimental technique. Typically, the threshold temperature value may be 350° C. to 450° C. More preferably, the threshold temperature value may be about 400° C.

After setting the dynamic pressure increasing control flag F to a suitable state, the engine-controlling ECU 30 starts the valve-opening timing control and the fuel injection timing control (steps S214 and S216). The contents of these controls are substantially the same as the above-described contents of the controls in the first embodiment, except that a control for increasing the dynamic pressure is not performed in the second embodiment. Therefore, these controls will not be described again.

After the valve-opening timing control and the fuel injection control, the engine-controlling ECU 30 executes a boost pressure control (step S218). As shown in FIG. 14, the diesel engine 10 is equipped with the turbocharger 20, whereby the pressure in the intake pipe 12 is increased above the atmospheric pressure so that a great amount of air can be supplied into each combustion chamber. Increasing the pressure in the intake pipe above the atmospheric pressure is termed "pressure-charging", and the amount of increase from the pressure occurring in the intake pipe prior to the pressure-charge is termed "boost pressure". If the boost pressure is increased, the amount of oxygen usable for combustion correspondingly increases, thereby achieving advantages of improving the maximum output of the engine, and reducing the amount of emission of carbon-containing suspended particulates, such as soot and the like, even under a condition of constant output, etc. The diesel engine 10 of this embodiment controls the turbine opening area (the area of opening through which exhaust gas flows into the turbine 21 of the turbocharger 20) by driving the actuator 70. In this manner, a suitable boost pressure in accordance with the engine operation condition can be attained. Furthermore, if the amount of flow of exhaust gas is great and the boost pressure tends to become excessively high, a control for avoiding an excessive increase in the boost pressure is performed by opening the waste gate valve 72 so as to bypass a portion of exhaust gas.

The setting of the turbine opening area varies between the case where the dynamic pressure increasing control is performed and the case where the control is not performed. Therefore, two sets of maps, that is, a set of maps indicating the turbine opening area for the case where the dynamic pressure increasing control is performed, and a set of maps indicating the turbine opening area for the case where the dynamic pressure increasing control is not performed, that is, the normal control is performed, are pre-stored in the engine-controlling ECU 30. By referring to a suitable map in accordance with the state of the dynamic pressure increasing control flag F, the engine-controlling ECU 30 is able to set an optimal turbine opening area.

After ending the fuel injection control as described above, the engine-controlling ECU 30 detects whether the inserted startup key has been returned to an "OFF" position (step S220). If the key has not been returned to the "OFF" position, the engine-controlling ECU 30 goes back to step S202, and performs the series of processes again. Thus, the engine-controlling ECU 30 repeats the above-described process until the startup key is returned to the "OFF" position. Therefore, the engine is always optimally controlled in accordance with the operation condition. If the dynamic pressure increasing control flag F is in the "ON" state, the dynamic pressure increasing control is performed by setting a suitable turbine opening area in accordance with the "ON" state of the dynamic pressure increasing control flag F.

C-3. Dynamic Pressure Increasing Control of Second Embodiment

As described above, the dynamic pressure increasing control of the second embodiment is performed by executing the boost pressure control with reference to one of two maps in which turbine opening areas are stored, that is, the map for the dynamic pressure increasing control. A change in the turbine opening area can increase the dynamic pressure on the emission control filter 100 for the following reasons.

In a normal operation condition where the dynamic pressure increasing control is not performed, the turbine opening area is set at a value such as to meet requirements in various factors, such as the responsiveness of the boost pressure, the durability of the engine, the fuel consumption efficiency, etc., in good balance. That is, in the normal operation condition, the turbine opening area is not set at a value that causes a highest value of the boost pressure. Therefore, if the dynamic pressure increasing control flag F is set at the "ON" state, the turbine opening area is set at a value that causes the highest value of the boost pressure. If the boost pressure rises, the amount of air supplied into the combustion chambers increases, and therefore, the amount of exhaust gas increases as well. Due to the increase in the amount of exhaust gas, the dynamic pressure on the emission control filter 100 will increase.

If the waste gate valve 72 is open so that a portion of exhaust gas bypasses the turbocharger 20, it is possible to close the waste gate valve 72 instead of changing the turbine opening area. If the waste gate valve is closed, the boost pressure rises, and therefore, the amount of exhaust gas increases, so that the dynamic pressure on the emission control filters 100 can be increased.

C-4. Modifications

C-4-1. First Modification

In a construction where the exhaust pipe from each cylinder of the engine is connected to the exhaust pipes of other cylinders via communicating passages, it is also possible to adopt an arrangement in which the communicating passages are provided with open-close valves and, if the dynamic pressure increasing control is to be performed, the communicating passages are closed, instead of increasing the boost pressure. Generally, the arrangement in which the exhaust pipes from different cylinders are interconnected via communicating passages is adopted for the purpose of bringing the phase of pulsating waves that reciprocate within the exhaust pipes into agreement with the exhaust valve opening-closing timing and thereby improving the exhaust efficiency, or the purpose of quickly discharging exhaust gas from a cylinder via the exhaust pipe of an adjacent cylinder as well and thereby reducing the exhaust resistance.

Figure 16:
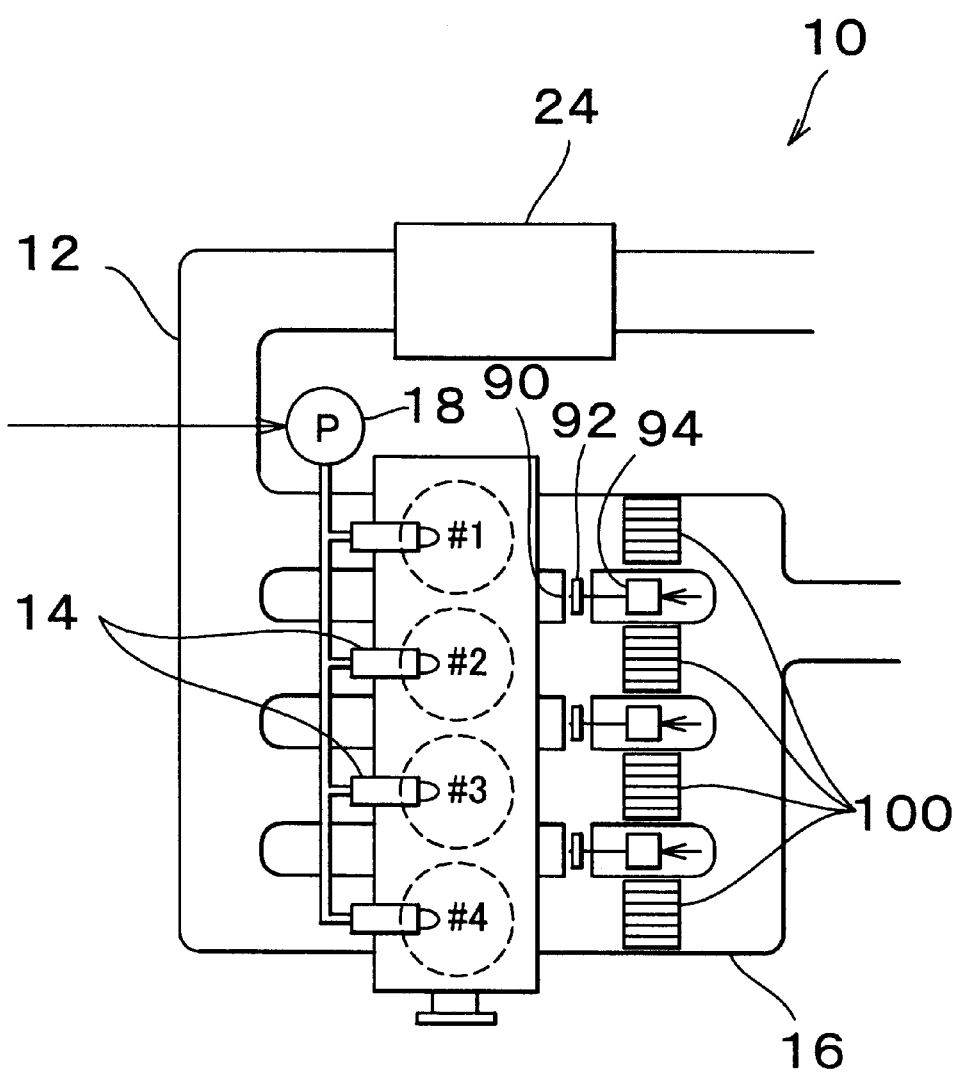
FIG. 16 is a diagram that illustrates a construction of an emission control apparatus in accordance with a modification in which the dynamic pressure on the emission control filter is increased by opening and closing communication pipes.

FIG. 16 is a diagram illustrating a diesel engine that performs the dynamic pressure increasing control by using communicating passages connected to the exhaust pipes of the cylinders. As shown in FIG. 16, the exhaust pipe of each cylinder is connected to the exhaust pipe of an adjacent cylinder via a communicating passage 90. Each communicating passage 90 is provided with an open-close valve 92 that is connected to an actuator 94. In a normal operation condition, that is, a condition where the dynamic pressure increasing control is not performed, the open-close valves 92 are in an "OPEN" state. If the dynamic pressure increasing control is performed, the open-close valves 92 are set to a "CLOSED" state by the actuators 94. If the open-close valves 92 are closed, the entire amount of exhaust gas from a cylinder flows through the exhaust pipe of the cylinder, without any portion of the gas flowing into the exhaust pipe of an adjacent cylinder. As a result, the flow speed of exhaust gas through the exhaust pipe increases, so that the dynamic pressure on the emission control filter 100 increases.

C-4-2. Second Modification

Although in the foregoing embodiments, the emission control filters 100 have the spontaneous regeneration function as described above with reference to FIG. 2, it is also possible to employ an ordinary emission control filter that is loaded with a generally termed oxidation catalyst.

Figure 17A:
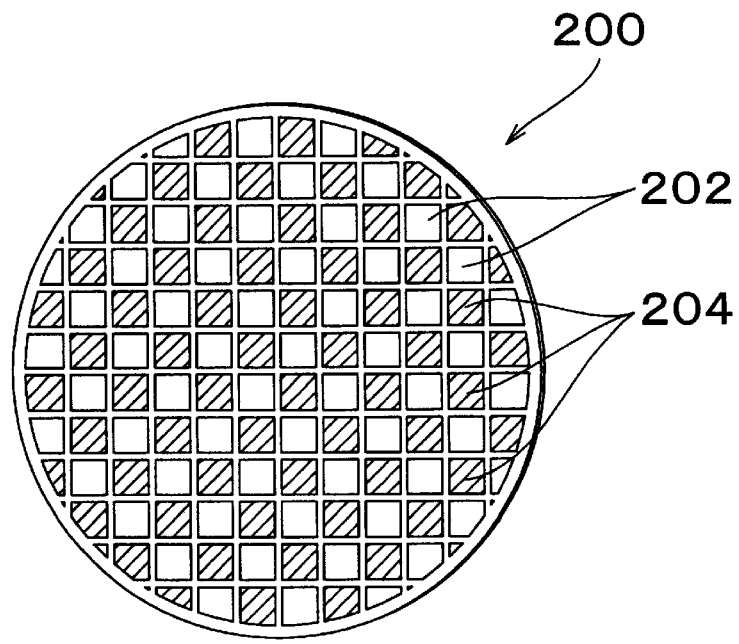
FIGS. 17A and 17B are diagrams that conceptually illustrate a structure of an emission control filter loaded with an oxidation catalyst.
Figure 17B:
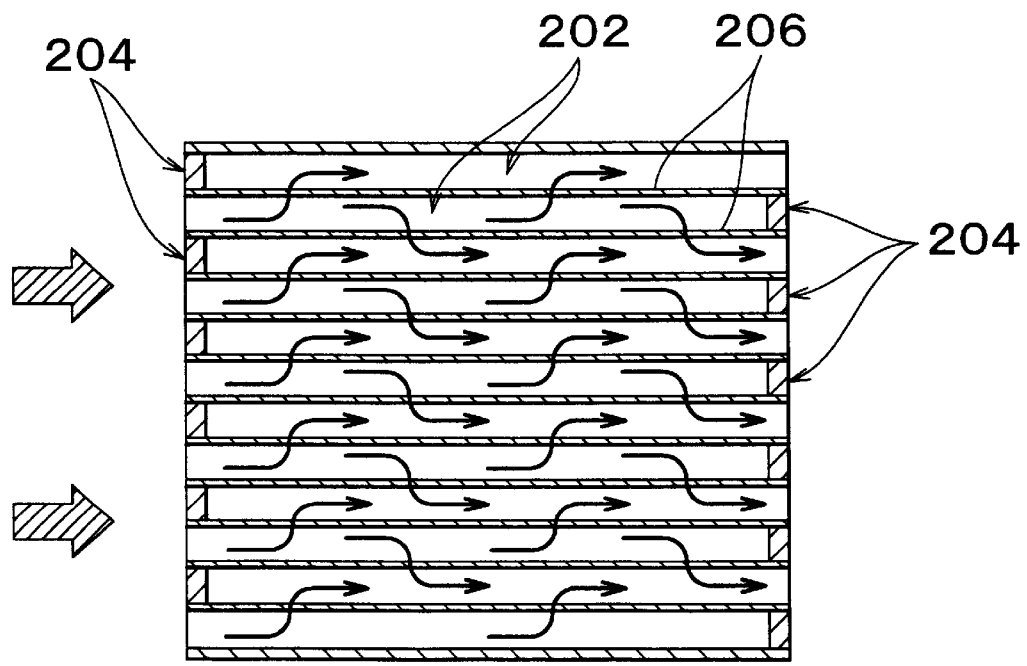

FIGS. 17A and 17B are diagrams illustrating the structure of an emission control filter 200 loaded with an oxidation catalyst. FIG. 17A is an elevation of the emission control filter 200 viewed from a side of inflow of exhaust gas. FIG. 17B is a side sectional view of the filter. As shown in the diagrams, the emission control filter 200 has a structure in which a cordierite-made ceramic filter having a generally termed honeycomb structure is loaded with a precious metal catalyst, for example, platinum or the like. The material of the ceramic filter is not limited to cordierite, but may also be other well-known ceramic materials, such as silicon carbide, silicon nitride, etc. The interior of the honeycomb structure emission control filter 200 has many passages 202 through which exhaust gas flows. The upstream or downstream end of each passage 202 is provided with a seal 204 so that the seals form a staggered arrangement as shown in FIGS. 17A and 17B. In FIG. 17A, the seals 204 are indicated by hatching.

When exhaust gas containing carbon-containing suspended particulates approaches the emission control filter 200 from the left in FIG. 17B, the exhaust gas flows into the emission control filter 200 via passages 202 that are not provided with upstream-end seals 204. Since these passages are closed by the seals 204 at the downstream end, exhaust gas flows from the passages into passages 202 that are not provided with downstream-end seals 204, via partitions 206 between the passages 202. Cordierite has an internal porous structure formed at the time of baking. Therefore, when exhaust gas passes through the porous structure in the partitions 206, carbon-containing suspended particulates and the like in exhaust gas can be trapped.

Even in the case of the above-described emission control filter, low exhaust gas temperature makes it difficult to burn the carbon-containing particulates collected on the filter. Furthermore, the emission control filter may also be clogged to some extent if a great amount of carbon-containing suspended particulates is instantaneously discharged from the engine. If that happens, the combustion of carbon-containing particulates can be accelerated by increasing the filter temperature as well in the case of the oxidation catalyst-loaded emission control filter.

Figure 19A:
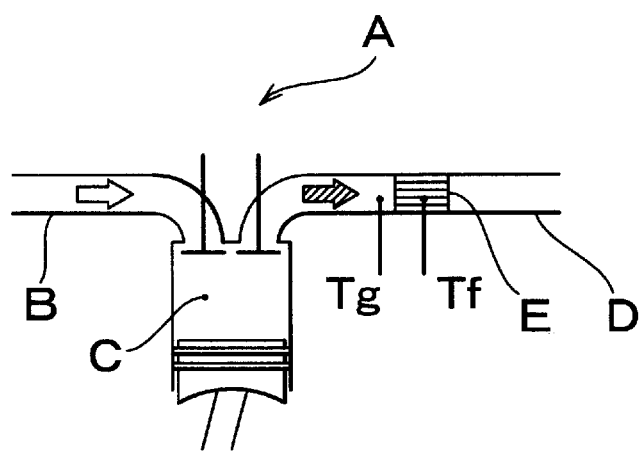
FIGS. 19A and 19B are diagrams indicating a principle whereby the dynamic pressure acting on an emission control filter increases the filter temperature.
Figure 19B:
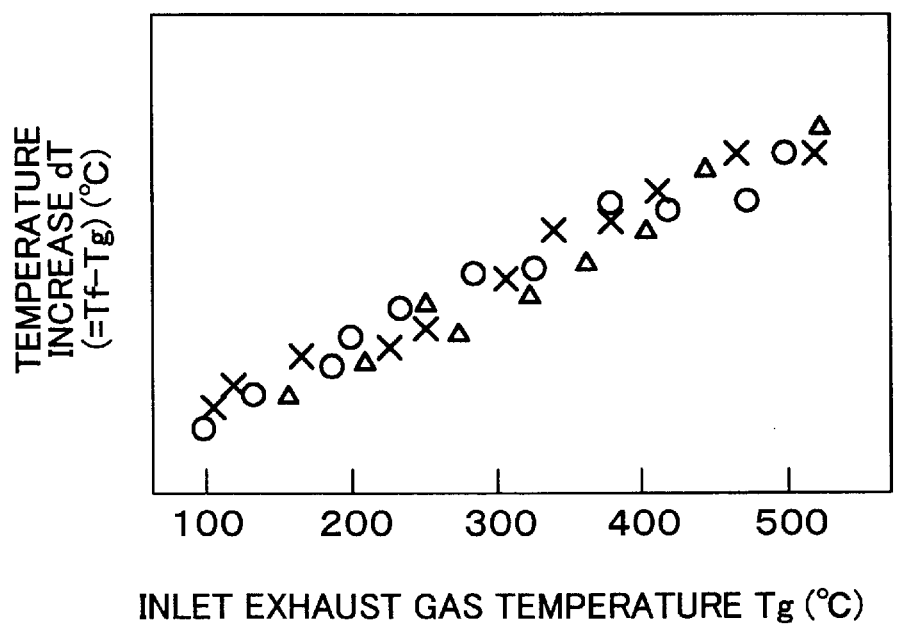

As is apparent from the principle described with reference to FIGS. 19A and 19B, that is, the principle in conversion of dynamic pressure on the emission control filter into temperature of the filter, the filter temperature can be raised by increasing the dynamic pressure as well in the case where the emission control filter 200 shown in FIGS. 17A and 17B is used. Therefore, if the exhaust gas temperature is low, or if the differential pressure across the filter is great, the combustion of carbon-containing particulates collected on the filter can be accelerated by increasing the filter temperature by means of the control of increasing the dynamic pressure on the filter. Thus, the filter clogging can be effectively avoided.

C-4-3. Third Modification

Figure 18:
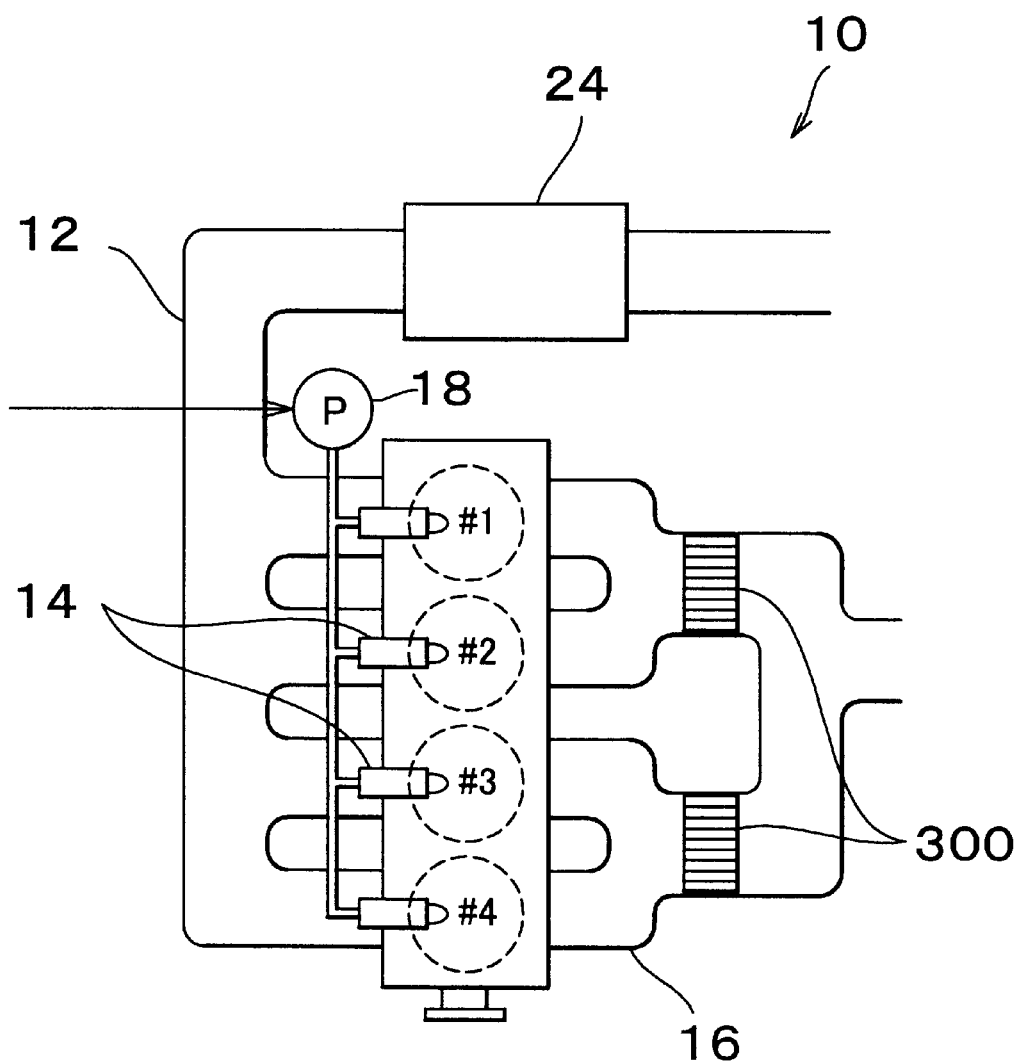
FIG. 18 is a diagram illustrating an arrangement in which an emission control filter is provided for every two or more cylinders in an emission control apparatus in accordance with a modification.

Although in the foregoing embodiments, the emission control filters are provided for the individual cylinders, it is also possible to provide an emission control filter for every two or more cylinders. FIG. 18 is a diagram illustrating an arrangement in which an emission control filter 300 is provided for every two cylinders. In the case where exhaust gas from a plurality of cylinders is caused to flow into a single emission control filter as indicated in FIG. 18, a larger installation space for each emission control filter is allowed than in the case where emission control filters are provided separately for individual cylinders. Thus, the arrangement shown in FIG. 18 makes it possible to adopt an optimal configuration of the emission control filters, and is therefore preferable.

While the invention has been described with reference to what are presently considered to be preferred embodiments thereof, it is to be understood that the invention is not limited to the disclosed embodiments or constructions. To the contrary, the invention can also be carried out in various other forms within the spirit of the invention.

For example, the various methods for determining whether there is a need to raise the temperature of the emission control filters, and the various methods for increasing the dynamic pressure on the emission control filters may be employed singly or in any combination.

If dynamic pressure of exhaust gas is increased, a temperature of an emission control filter is increased efficiently. Therefore, it is preferable that an emission control filter is disposed upstream of a connecting portion of the exhaust manifold connecting its branch pipes.

What is claimed is:

1. An emission control apparatus for reducing carbon-containing particulates contained in an exhaust gas from an internal combustion engine, comprising:

a heat-resistant filter provided in a passage of the exhaust gas for collecting the carbon-containing particulates and controlling the exhaust gas through combustion of the particulates collected;

a temperature increase need determining device that determines whether to increase a temperature of the heat-resistant filter; and a dynamic pressure increasing device that increases a dynamic pressure of the exhaust gas on the heat-resistant filter if it is determined that the temperature of the heat-resistant filter is to be increased, wherein the dynamic pressure increasing device increases the dynamic pressure by advancing a valve opening timing of an exhaust valve provided in a combustion chamber of the internal combustion engine.

2. An emission control apparatus for reducing carbon-containing particulates contained in an exhaust gas from an internal combustion engine, comprising:

a heat-resistant filter provided in a passage of the exhaust gas for collecting the carbon-containing particulates and controlling the exhaust gas through combustion of the particulates collected;

a temperature increase need determining device that determines whether to increase a temperature of the heat-resistant filter; and a dynamic pressure increasing device that increases a dynamic pressure of the exhaust gas on the heat-resistant filter if it is determined that the temperature of the heat-resistant filter is to be increased, wherein the dynamic pressure increasing device increases the dynamic pressure by retarding a valve opening timing of an exhaust valve provided in a combustion chamber of the internal combustion engine by at least a predetermined value.

3. An emission control apparatus for reducing carbon-containing particulates contained in an exhaust gas from an internal combustion engine, comprising:

a heat-resistant filter provided in a passage of the exhaust gas for collecting the carbon-containing particulates and controlling the exhaust gas through combustion of the particulates collected;

a temperature increase need determining device that determines whether to increase a temperature of the heat-resistant filter; and a dynamic pressure increasing device that increases a dynamic pressure of the exhaust gas on the heat-resistant filter if it is determined that the temperature of the heat-resistant filter is to be increased, wherein the internal combustion engine is operated by injecting a fuel into a combustion chamber of the internal combustion engine and burning the fuel, and wherein the dynamic pressure increasing device increases the dynamic pressure by injecting an additional fuel during an expansion stroke of the internal combustion engine.

4. An emission control apparatus for reducing carbon-containing particulates contained in an exhaust gas from an internal combustion engine, comprising:

a heat-resistant filter provided in a passage of the exhaust gas for collecting the carbon-containing particulates and controlling the exhaust gas through combustion of the particulates collected;

a temperature increase need determining device that determines whether to increase a temperature of the heat-resistant filter; and a dynamic pressure increasing device that increases a dynamic pressure of the exhaust gas on the heat-resistant filter if it is determined that the temperature of the heat-resistant filter is to be increased, wherein the internal combustion engine is operated by injecting a fuel into a combustion chamber of the internal combustion engine and burning the fuel, and wherein the dynamic pressure increasing device increases the dynamic pressure by retarding a timing of injecting the fuel.

5. An emission control apparatus for reducing carbon-containing particulates contained in an exhaust gas from an internal combustion engine, comprising:

a heat-resistant filter provided in a passage of the exhaust gas for collecting the carbon-containing particulates and controlling the exhaust gas through combustion of the particulates collected;

a temperature increase need determining device that determines whether to increase a temperature of the heat-resistant filter; and a dynamic pressure increasing device that increases a dynamic pressure of the exhaust gas on the heat-resistant filter if it is determined that the temperature of the heat-resistant filter is to be increased;

a turbocharger for compressing an air and supplying a compressed air into a combustion chamber of the internal combustion engine, wherein the dynamic pressure increasing device increases the dynamic pressure by increasing a boost pressure of the turbocharger.

6. An emission control apparatus for reducing carbon-containing particulates contained in an exhaust gas from an internal combustion engine, comprising:

a heat-resistant filter provided in a passage of the exhaust gas for collecting the carbon-containing particulates and controlling the exhaust gas through combustion of the particulates collected;

a temperature increase need determining device that determines whether to increase a temperature of the heat-resistant filter; and a dynamic pressure increasing device that increases a dynamic pressure of the exhaust gas on the heat-resistant filter if it is determined that the temperature of the heat-resistant filter is to be increased, wherein the internal combustion engine includes:
a plurality of combustion chambers;
a plurality of exhaust passages provided separately for the combustion chambers for discharging the exhaust gas from the combustion chambers;
a plurality of communication passages for interconnecting the exhaust passages in communication; and
open-close valves provided separately for the communication passages, wherein the dynamic pressure increasing device increases the dynamic pressure by closing the open-close valves.

* * * * *